(12) United States Patent
Kikuzuki

(10) Patent No.: US 9,706,427 B2
(45) Date of Patent: Jul. 11, 2017

(54) COMMUNICATION METHOD, COMMUNICATION SYSTEM, AND COMMUNICATION DEVICE

(71) Applicant: FUJITSU LIMITED, Kawasaki-shi, Kanagawa (JP)

(72) Inventor: Tatsuya Kikuzuki, Sodegaura (JP)

(73) Assignee: Fujitsu Limited, Kawasaki (JP)

(*) Notice: Subject to any disclaimer, the term of this patent is extended or adjusted under 35 U.S.C. 154(b) by 16 days.

(21) Appl. No.: 14/673,899

(22) Filed: Mar. 31, 2015

(65) Prior Publication Data

US 2015/0341820 A1    Nov. 26, 2015

(30) Foreign Application Priority Data

May 20, 2014  (JP) ................ 2014-104462

(51) Int. Cl.
*H04B 5/00*    (2006.01)
*H04W 28/02*   (2009.01)
*H04W 4/00*    (2009.01)
*H04W 74/00*   (2009.01)
*H04W 74/08*   (2009.01)

(52) U.S. Cl.
CPC ....... *H04W 28/0215* (2013.01); *H04W 4/008* (2013.01); *H04W 74/006* (2013.01); *H04W 74/0816* (2013.01)

(58) Field of Classification Search
CPC .. H04W 4/008; H04W 76/00; H04W 74/0816
USPC ..................................................... 455/41.1
See application file for complete search history.

(56) References Cited

U.S. PATENT DOCUMENTS

2010/0311435 A1* 12/2010 Mueck .................. H04W 48/20
455/453

FOREIGN PATENT DOCUMENTS

JP    2011-223419    11/2011

OTHER PUBLICATIONS

EESR—Extended European Search Report of European Patent Application No. 151597127 dated Oct. 15, 2015.

(Continued)

*Primary Examiner* — Eugene Yun
(74) *Attorney, Agent, or Firm* — Fujitsu Patent Center

(57) ABSTRACT

A communication method for use in a communication system having a plurality of communication devices includes: a first communication device transmitting within a predefined period a connection request signal requesting a connection with another communication device; a second communication device transmitting a connection permit signal which contains the number of connection request signals received during the predefined period as the number of requesting candidates; the first communication device obtaining a transmission probability defining the probability of signal transmission such that the transmission probability decreases as the number of requesting candidates contained in the connection permit signal received from the second communication device increases; and the first communication device making a decision as to whether or not to transmit a signal out in accordance with the transmission probability at the timing that the signal can be transmitted to the second communication device.

12 Claims, 18 Drawing Sheets

(56) References Cited

OTHER PUBLICATIONS

Zhi Ang Eu, et al.,"Design and performance analysis of MAC schemes for Wireless Sensor Networks Powered by Ambient Energy Harvesting", Ad Hoc Networks, May 1, 2011, pp. 300-323, vol. 9, No. 3, Elsevier, Amsterdam, NL.

IEEE P802.15.6(TM)/D04,Draft Standard for Information Technology—Telecommunications and Information Exchange Between Systems—Local and Metropolitan Area Networks—Specific Requirements-; IEEE Draft; D04P802-15-6_DRAFT_STANDART, IEEE-SA, Piscataway, NJ, USA, vol. 1 802.15.6, Jun. 28, 2011 (Jun. 28, 2011), pp. 1-280.

* cited by examiner

FIG. 18
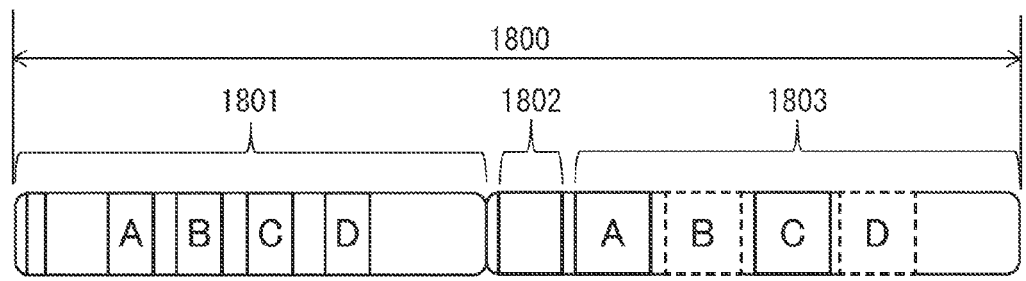
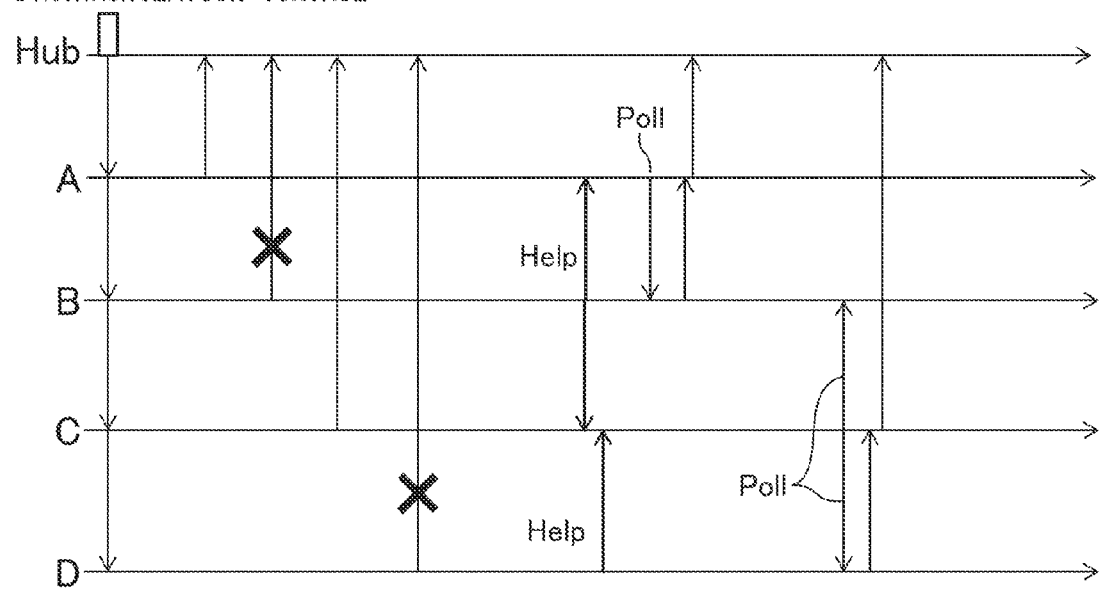

COMMUNICATION METHOD, COMMUNICATION SYSTEM, AND COMMUNICATION DEVICE

CROSS-REFERENCE TO RELATED APPLICATION

This application is based upon and claims the benefit of priority of the prior Japanese Patent Application No. 2014-104462, filed on May 20, 2014, the entire contents of which are incorporated herein by reference.

FIELD

The embodiments discussed herein are related to a communication method in which one or more communication devices communicate with other communication devices, and to a communication system and communication device in which such a communication method is implemented.

BACKGROUND

A wireless communication system in which a relay device receives signals transmitted from one or more communication devices and relays the signals on to other communication devices has been researched for many years (for example, refer to Japanese Laid-open Patent Publication No. 2011-223419).

In such a wireless communication system, if a plurality of communication devices simultaneously transmit out signals, congestion may occur at the relay device, and the relay device may become unable to receive the signals. Therefore, in case of congestion, each communication device performs signal retransmission control.

For example, such retransmission control is defined in IEEE 802.15.6 which sets communication standards for short-range wireless communication networks such as a body area network (BAN) in which communications are performed between a plurality of body-worn communication devices.

When first transmitting a signal, a communication device conforming to IEEE 802.15.6 makes a decision as to whether or not to transmit the signal with a preset transmission probability (for example, ½) at the timing that the communication device can transmit the signal. Then, if the communication device relaying the signal fails to relay the signal, the communication device transmitting the signal reduces the transmission probability (for example, to one half of the first transmission probability, for example, to ¼) at the next timing to transmit the signal. In this way, the communication device reduces the transmission probability each time it fails to transmit the signal, thereby reducing the chance of congestion due to a problem between the signal transmitted from the communication device and the signals transmitted from other communication devices.

SUMMARY

However, since the transmission probability is preset irrespective of the number of actually contending communication devices, there has been the problem with the retransmission control that the time taken to achieve successful communication may be long.

According to one embodiment, a communication method for a communication system including a plurality of communication devices is provided. The communication method includes: a first communication device of the plurality of communication devices transmitting within a predefined period a connection request signal requesting a connection with another communication device of the plurality of communication devices; a second communication device of the plurality of communication devices transmitting a connection permit signal which contains the number of connection request signals received during the predefined period as the number of requesting candidates indicating the number of signals likely to contend at the second communication device; the first communication device obtaining a transmission probability defining the probability of signal transmission such that the transmission probability decreases as the number of requesting candidates contained in the connection permit signal received from the second communication device increases; and the first communication device making a decision as to whether or not to transmit out a signal in accordance with the transmission probability at the timing that the signal can be transmitted to the second communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 is a diagram illustrating one example of a superframe according to a further modified example.

DESCRIPTION OF EMBODIMENTS

A communication method according to an embodiment or a modified example and a wireless communication system in which the communication method is implemented will be described below with reference to the drawings.

First, a description will be given of the case in which the transmission probability preset in the communication device requesting another communication device to relay a signal is inappropriate. For convenience of explanation, the communication device requesting the relay of a signal will hereinafter be referred to as the connection requesting communication device, and the communication device that relays the signal as the connecting communication device or the relay device.

Figure 1:
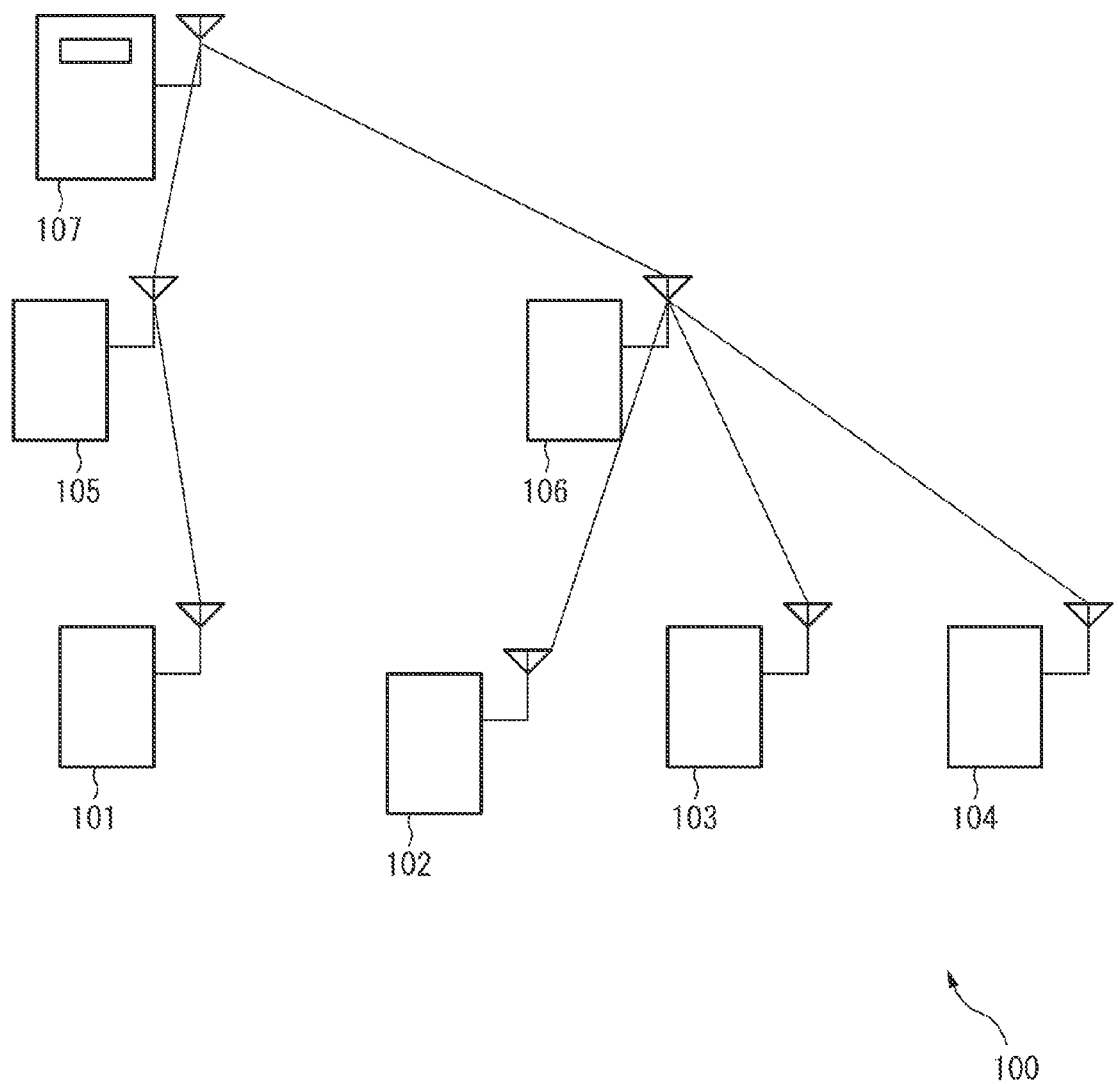
FIG. 1 is a diagram illustrating one example of a wireless communication system containing a plurality of communication devices according to the prior art.

FIG. 1 is a diagram illustrating one example of a wireless communication system containing a plurality of communication devices according to the prior art. The wireless communication system 100 includes four communication devices 101 to 104, two relay devices 105 and 106, and a base station 107. It is assumed that each communication device does not know in advance which relay device it will be connected to. In connection of this, it is assumed that the number of communication devices likely to contend at any one relay device is 2, and the reciprocal of the number of communication devices likely to contend, i.e., ½, is preset in each communication device as the transmission probability defining the probability of signal transmission.

Suppose that at a given time, the communication device 101 is capable of communicating with the relay device 105, on the other hand, the communication devices 102 to 104 are capable of communicating with the relay device 106. The relay devices 105 and 106 are both capable of communicating with the base station 107.

In this case, since only the communication device 101 is connected to the relay device 105, there is no concern that the signal transmitted from the communication device 101 might contend at the relay device 105 with signals transmitted from other communication devices. Therefore, the communication device 101 can transmit the signal at any given time without any concern that the signal might fail to reach the base station 107. However, in the illustrated example, since the communication device 101 transmits the signal with the transmission probability of ½, the timing for signal transmission may be needlessly delayed.

On the other hand, in the case of the relay device 106 to which the three communication devices 102 to 104 are connected, if the communication devices 102 to 104 each transmit a signal with the transmission probability of ½, the expected value of the number of signals that the relay device 106 simultaneously receives becomes larger than 1. This can overly increase the chance of signal congestion at the relay device 106. As a result, the time that each of the communication devices 102 to 104 takes to succeed in transmitting a signal to the base station 107 may become too long. In this way, if the transmission probability preset in each communication device is not appropriate for the number of devices contending at the relay device that actually relays the signal, the time that each communication device takes to succeed in communicating with the base station increases.

In view of the above, in the wireless communication system according to the present embodiment, if a communication device tried to transmit a signal directly to the base station but failed, then the communication device operates as the connection requesting communication device. The connection requesting communication device then transmits a signal relay request signal (hereinafter referred to as the help signal) to another communication device. On the other hand, a communication device that succeeded in transmitting a signal to the base station operates as the connecting communication device. The connecting communication device counts the number of help signals received, and takes the number as being the number of requesting candidates indicating the number of signals likely to contend at the connecting communication device. Then, the connecting communication device sends a poll signal containing the number of requesting candidates to the requesting communication devices. The connection requesting communication device sets the transmission probability by taking the reciprocal of the number of requesting candidates contained in the poll signal, and makes a decision as to whether or not to transmit a signal out each time the signal transmit timing arrives. Since the connection requesting communication device can set the transmission probability appropriate for the number of devices likely to contend at the connecting communication device serving as the relay device for relaying the signal, the connection requesting communication device can shorten the time it takes to communicate with the base station.

In the present embodiment, each communication device communicates with other devices in accordance with a communication method conforming to IEEE 802.15.6. However, each communication device may communicate with other devices in accordance with a communication method conforming to any other wireless communication standard that can relay signals.

Figure 2:
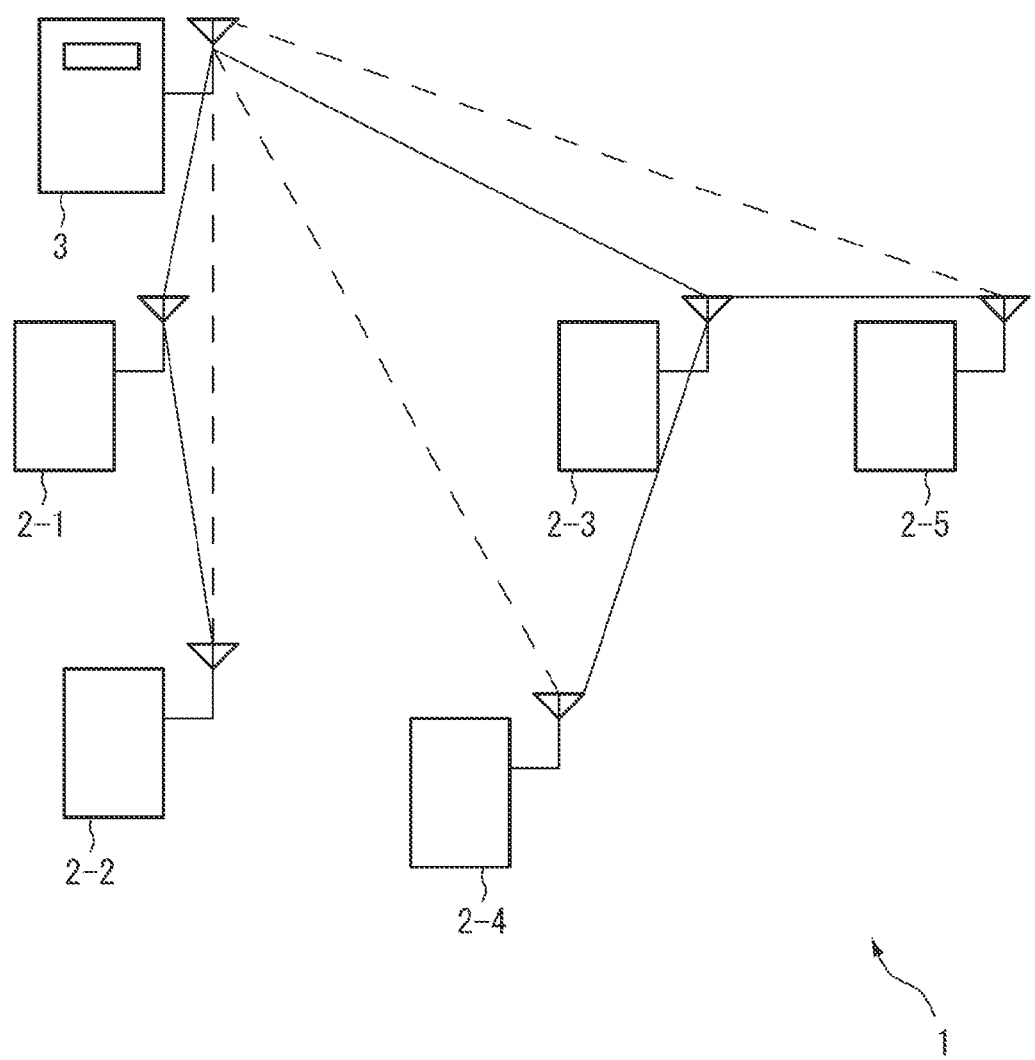
FIG. 2 is a diagram schematically illustrating the configuration of a wireless communication system according to the present embodiment.

FIG. 2 is a diagram schematically illustrating the configuration of the wireless communication system according to the present embodiment. The wireless communication system 1 includes five communication devices 2-1 to 2-5 and a base station 3. However, the number of communication devices contained in the wireless communication system 1 is only one example, and the number of communication devices constituting the wireless communication system 1 need not be limited to 5.

The communication devices 2-1 to 2-5 are, for example, portable communication terminals each worn on a human body, and each communication device is capable of communicating with the base station 3 as well as the other communication devices. The base station 3 is fixedly installed, for example, in one of the rooms in which human subjects wearing the respective communication devices 2-1 to 2-5 are located, and is capable of communicating with other apparatus via a wired communication link (not depicted). Then, the base station 3 receives signals from the communication devices 2-1 to 2-5, and transmits data contained in the signals to other apparatus via the wired communication link. The base station 3 may be connected to such other apparatus via a wireless link.

Of the communication devices 2-1 to 2-5, any communication device connected to the base station 3 can receive a signal from any other communication device and relay it to the base station 3. Whether a given communication device can be connected to the other communication devices as well as to the base station depends on the distance between the communication devices, the distance between the communication device and the base station, and the positional relationship of each communication device relative to the base station.

The communication devices 2-1 to 2-5 each communicate with the base station on a superframe basis.

Figure 3:
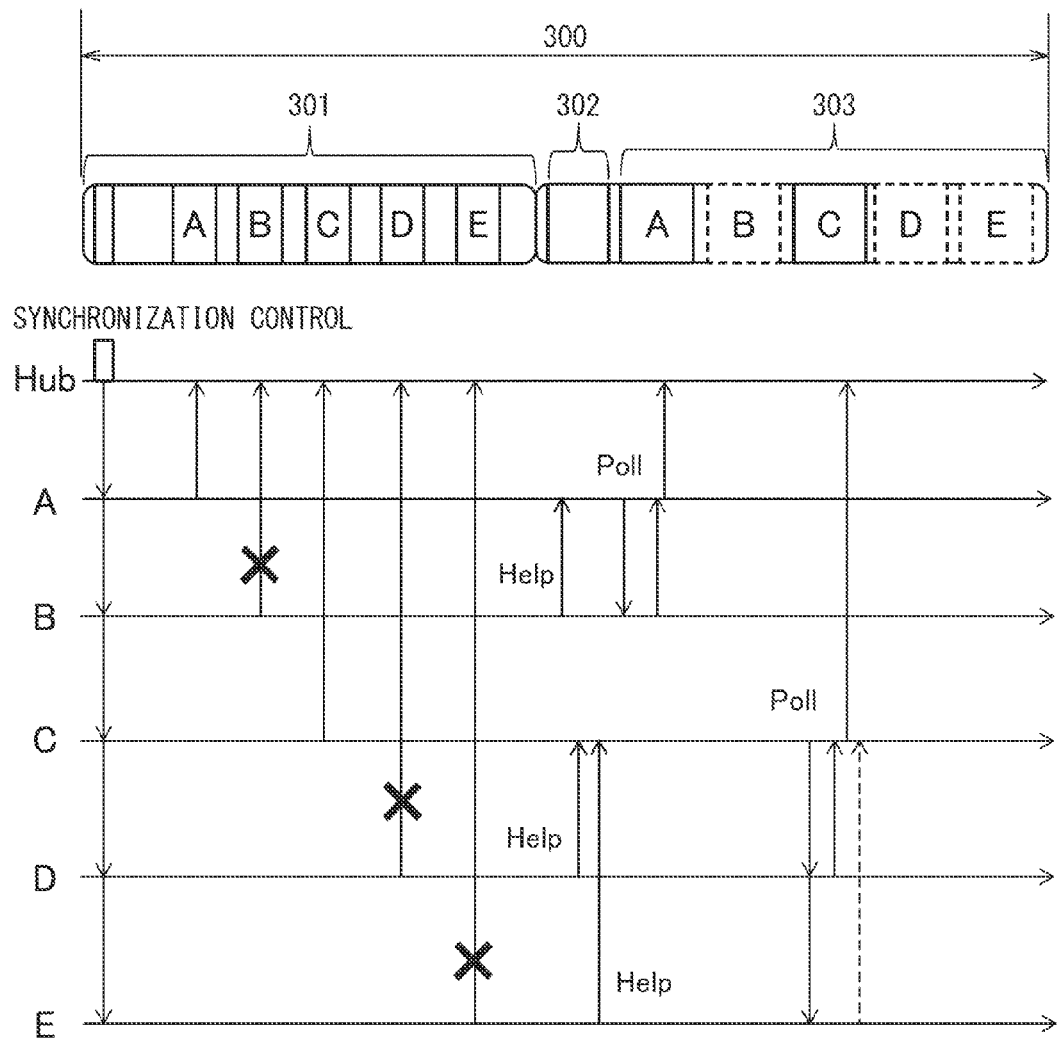
FIG. 3 is a diagram illustrating one example of the relationship between a superframe and a sequence of communications among communication devices.

FIG. 3 is a diagram illustrating one example of the relationship between a superframe and a sequence of communications among the communication devices. In FIG. 3, the horizontal axis represents the time. For convenience, in FIG. 3, the base station 3 is designated Hub, and the communication devices 2-1 to 2-5 are designated A to E, respectively. Each arrow indicates a signal transmitted between communication devices or transmitted from a given one of the communication devices to the base station. In the present embodiment, the superframe 300 includes a direct communication period 301, a help period 302, and a relay communication period 303. Further, a period during which the base station 3 sends broadcast information containing a synchronization signal and control information to each communication device may be included in the header portion of the superframe 300. The direct communication period 301 is the period during which each communication device can transmit a signal directly to the base station 3. The help period 302 is the period during which any communication device that failed to transmit a signal directly to the base station 3 requests a connection in order to request another communication device to relay the signal. The relay communication period 303 is the period during which the communication device connected to the base station 3 receives a signal from another communication device and relays it to the base station 3.

The superframe 300 has a length of a few hundred milliseconds to a few seconds, and each communication device is permitted to transmit a signal within the period allocated to the communication device from within the superframe. Each of the communication devices 2-1 to 2-5 can make a decision, independently of the others, as to whether or not to transmit a signal out within the period allocated to it.

Suppose that the communication devices 2-1 and 2-3 succeeded in transmitting signals directly to the base station 3 but the communication devices 2-2, 2-4, and 2-5 failed to transmit signals directly to the base station 3. Each communication device can determine that it has succeeded in transmitting a signal, for example, when an Ack signal is received from the base station 3. On the other hand, each communication device determines that it has failed to transmit a signal when an Ack signal is not received from the base station 3 within a predefined time interval after transmitting the signal to the base station 3.

In the above case, the communication devices 2-2, 2-4, and 2-5 operate as the connection requesting communication devices and send help signals to other communication devices. The help signal is one example of a connection request signal requesting a connection to a connecting communication device. The help signal can be set as a signal that is broadcast without specifying any destination communication device. The communication devices 2-2, 2-4, and 2-5 may each determine the help signal transmit timing in a random manner within the help period 302. This serves to reduce the chance of the help signals causing congestion at the communication devices 2-1 and 2-3.

On the other hand, the communication devices 2-1 and 2-3 operating as the connecting communication devices count the number of help signals received from the other communication devices and take the number as representing the number of requesting candidates. For example, suppose that the communication device 2-1 received the help signal from the communication device 2-2. In this case, the communication device 2-1 sets the number of requesting candidates to 1. On the other hand, suppose that the communication device 2-3 received the help signals from the communication devices 2-4 and 2-5. In this case, the communication device 2-3 sets the number of requesting candidates to 2.

Each of the communication devices 2-1 and 2-3, within the period allocated to itself from within the relay communication period 303, sends a poll signal containing the number of requesting candidates to each requesting communication device. The poll signal is one example of a connection permit signal that permits a connection from the connection requesting communication device. The poll signal may be set as a signal that is broadcast without specifying any destination communication device. However, when the number of requesting candidates is 1, the connecting communication device (in the illustrated example, the communication device 2-1) can identify the communication device that sent the help signal. Therefore, in this case, the connecting communication device may transmit the poll signal as a unicast signal addressed to the communication device that sent the help signal. Any communication device that did not receive any help signal does not send out a poll signal, since such a communication device does not serve as a connecting communication device.

When the poll signal is received, each of the communication devices 2-2, 2-4, and 2-5 sets the transmission probability by taking the reciprocal of the number of requesting candidates contained in the poll signal. For example, suppose that the communication device 2-2 received the poll signal from the communication device 2-1. In this case, since the poll signal indicates that the number of requesting candidates is 1, the communication device 2-2 sets the transmission probability to 1. Then, each time the poll signal is received, the communication device 2-2 makes a decision as to whether or not to transmit a signal out with that transmission probability until it succeeds in communicating with the base station 3 within the relay communication period 303. In the illustrated example, the communication device 2-2 may transmit a signal out each time the poll signal is received. In this case, each time a signal is received from the communication device 2-2, the communication device 2-1 responsible for relaying the signal received from the communication device 2-2 may relay the signal to the base station 3 because no signal contention occurs at the communication device 2-1.

Similarly, suppose that each of the communication devices 2-4 and 2-5 received the poll signal from the communication device 2-3. In this case, since the poll signal indicates that the number of requesting candidates is 2, each of the communication devices 2-4 and 2-5 sets the transmission probability to $\frac{1}{2}$. Then, each time the poll signal is received, each of the communication devices 2-4 and 2-5 makes a decision as to whether or not to transmit a signal out with the transmission probability until it succeeds in communicating with the base station 3 within the relay communication period 303. In this case, the expected value of the number of signals expected to be received simultaneously from the other communication device becomes equal to 1 at the communication device 2-3 that relays the signals received from the communication devices 2-4 and 2-5. This reduces the probability of congestion occurring at the communication device 2-3 with the signal from the communication device 2-4 contending with the signal from the communication device 2-5.

Figure 4:
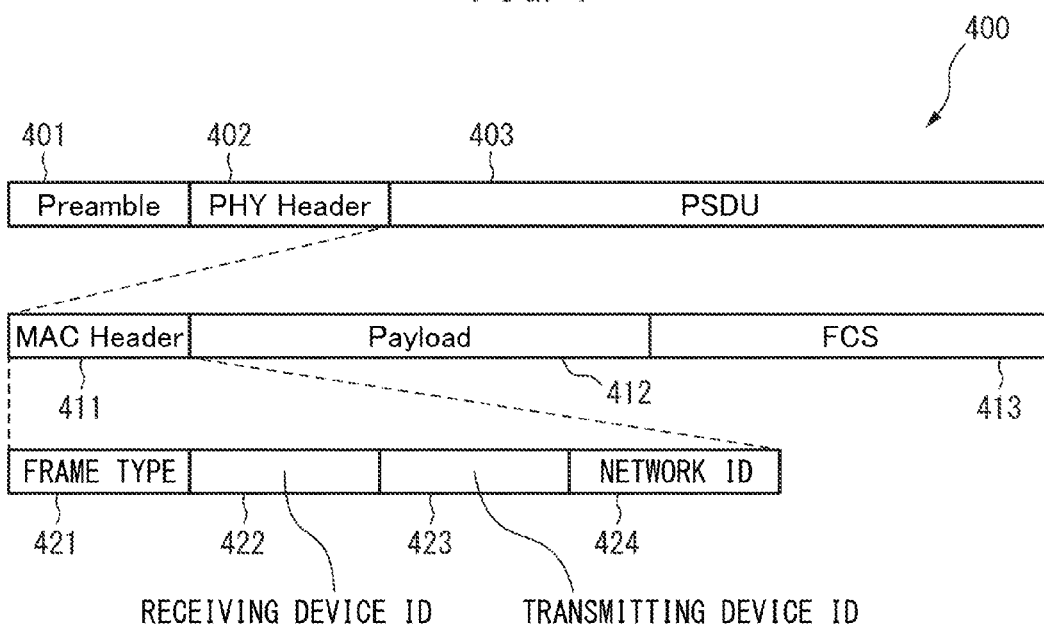
FIG. 4 is a diagram illustrating one example of a help signal.

FIG. 4 is a diagram illustrating one example of the help signal. The help signal 400 is generated in a packet format conforming to IEEE 802.15.6, and includes, in order from the top, a preamble field 401, a physical layer header field 402, and a physical-layer service data unit (PSDU) field 403. The PSDU field 403 includes a MAC header 411, a payload 412 that can carry data, and a frame check sequence (FCS) 413. The FCS 413 is an error-detection code that is used to check if the help signal has been received correctly or not. The MAC header 411 includes a frame type 421, identification information 422 identifying the receiving communication device, identification information 423 identifying the communication device transmitting the help signal 400, and identification information 424 identifying the network to which the communication device transmitting the help signal 400 is attached. In the help signal 400, the frame type 421 carries a bit string that indicates that the frame type is the help signal. Further, in the help signal 400, the receiving communication device identification information 422 carries a bit string that indicates that the help signal is a broadcast signal, i.e., a signal that does not specify any specific receiving device.

Figure 5:
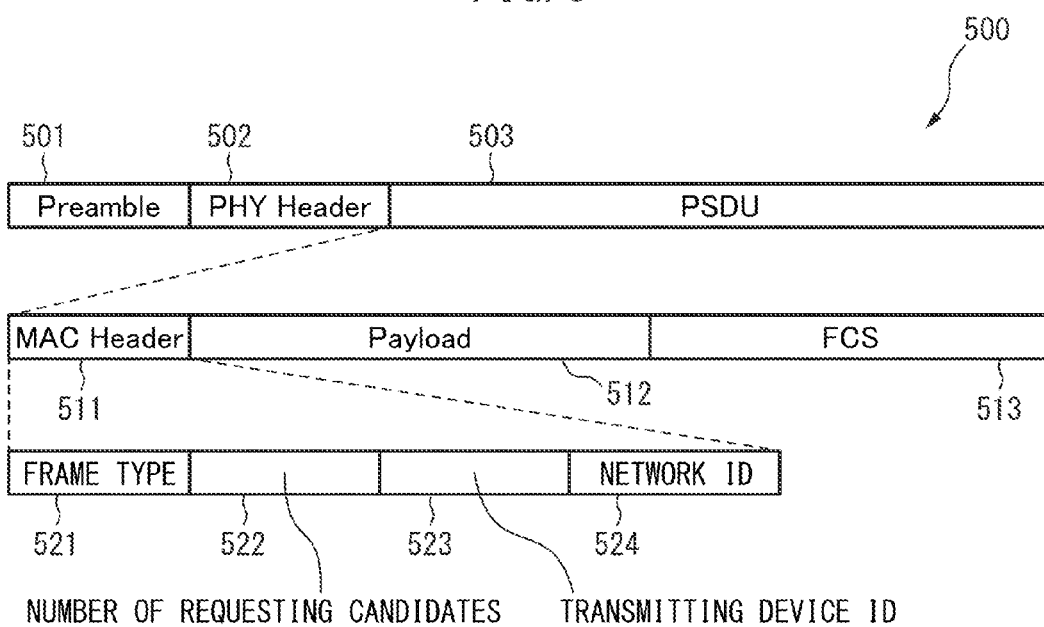
FIG. 5 is a diagram illustrating one example of a poll signal.

FIG. 5 is a diagram illustrating one example of the poll signal. The poll signal 500 is generated in the same packet format as that of the help signal, and includes, in order from the top, a preamble field 501, a physical layer header field 502, and a PSDU field 503. The PSDU field 503 includes a MAC header 511, a payload 512, and an FCS 513. The MAC header 511 includes a frame type 521, the number of requesting candidates 522, identification information 523 identifying the communication device transmitting the poll signal 500, and identification information 524 identifying the network to which the communication device transmitting the poll signal 500 is attached. In the poll signal 500, the frame type 521 carries a bit string that indicates that the frame type is the poll signal. The number of requesting candidates 522 carries a bit string that represents a numerical value corresponding to the number of requesting candidates. The number of requesting candidates may be represented in some other suitable form. For example, the number of requesting candidates 522 may carry as many pieces of identification information identifying the help signal transmitting communication devices as there are requesting candidates. When the number of requesting candidates is 1, i.e., when the poll signal 500 is generated as a unicast signal, the identification information of the communication device that transmitted the help signal may be carried as the number of requesting candidates 522 or in addition to the number of requesting candidates 522.

Figure 6:
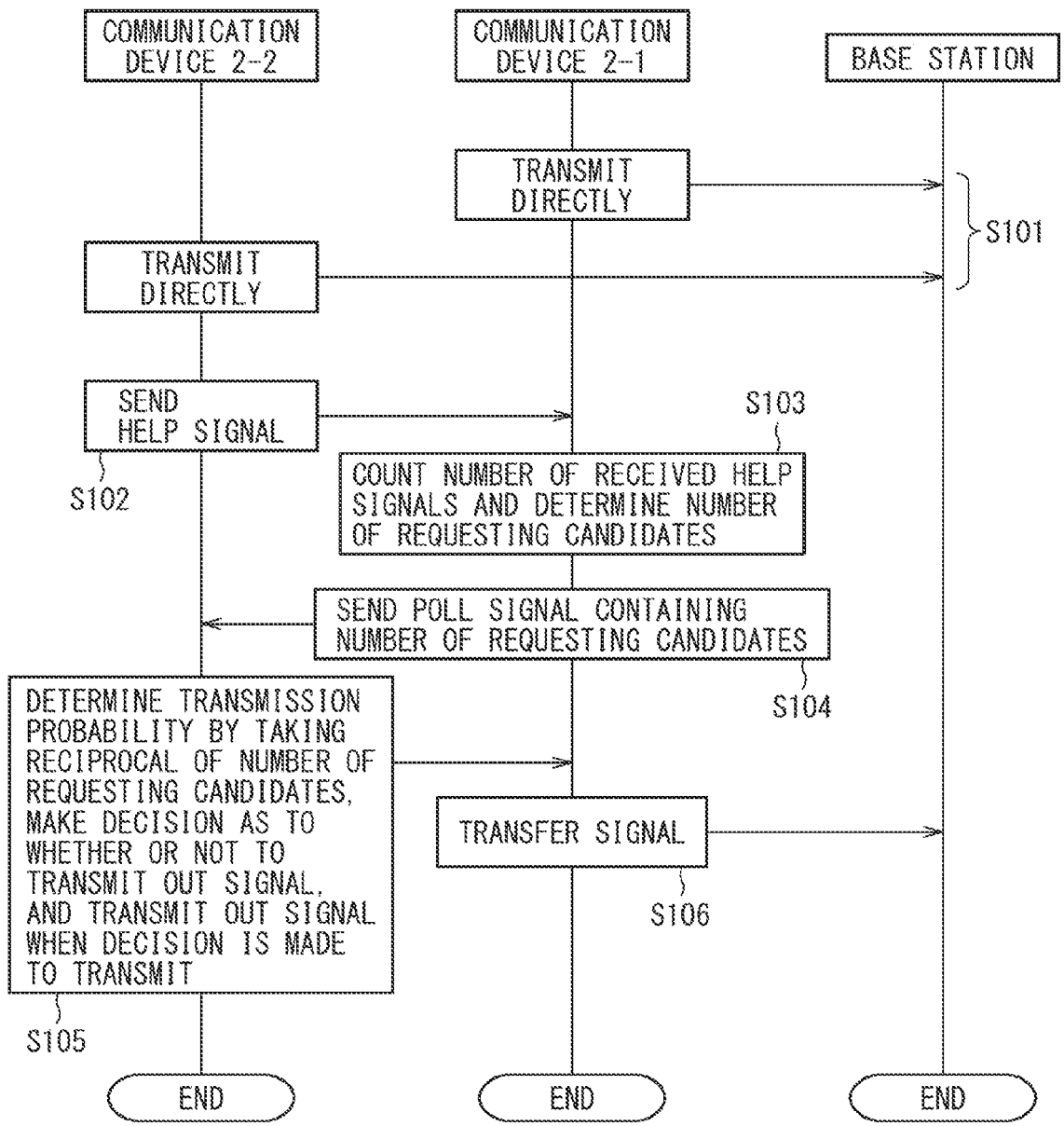
FIG. 6 is an operational sequence diagram illustrating the sequence of communication operations performed in the wireless communication system.

FIG. 6 is an operational sequence diagram illustrating the sequence of communication operations performed in the wireless communication system. The following describes the operational sequence performed between the communication device 2-2 and the communication device 2-1 operating as the connecting communication device for the communication device 2-2.

The communication devices 2-1 and 2-2 each transmit a signal directly to the base station 3 during the direct communication period in the superframe (step S101). Then, the communication device 2-2 that failed to transmit the signal directly to the base station 3 sends a help signal to the other communication device during the help period (step S102).

On the other hand, the communication device 2-1 that received the help signal counts the number of received help signals (step S103). Then, the communication device 2-1 generates a poll signal containing the number of requesting candidates, and sends the poll signal to the other communication device during the relay communication period (step S104). The communication device 2-2 that received the poll signal determines the transmission probability by taking the reciprocal of the number of requesting candidates contained in the poll signal. Then, the communication device 2-2 makes a decision as to whether or not to transmit the signal out with the transmission probability and, if a decision is made to transmit, then transmits out the signal (step S105). The communication device 2-1 receives the signal from the communication device 2-2 and transfers the signal to the base station 3 (step S106). Thereafter, the process of steps S104 to S106 is repeated until the communication device 2-2 succeeds in communicating with the base station 3. If the communication device 2-2 is capable of also receiving a poll signal from another communication device operating as a connecting communication device, the process of steps S104 to S106 may be performed between the communication device 2-2 and such other communication device.

The details of the communication devices will be described below. The communication devices 2-1 to 2-5 are identical in configuration and function as far as their configuration and function for communicating with the base station 3 is concerned. Accordingly, the communication device 2-1 will be described below.

Figure 7:
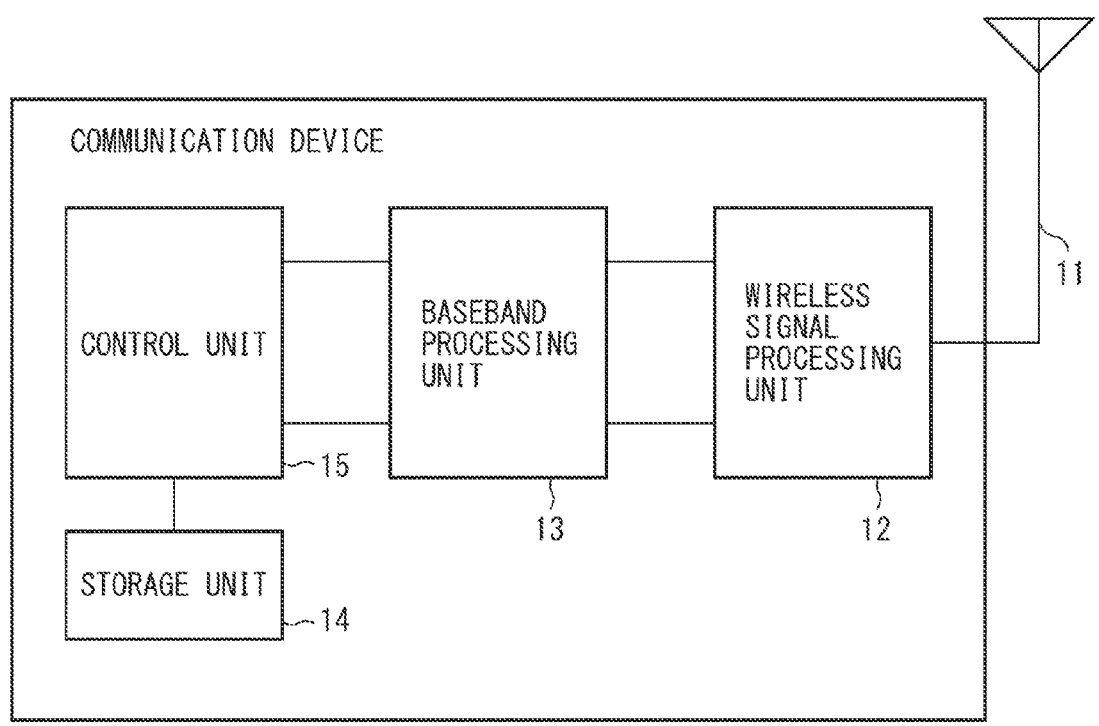
FIG. 7 is a diagram schematically illustrating the configuration of a communication device.

FIG. 7 is a diagram schematically illustrating the configuration of the communication device 2-1. The communication device 2-1 includes an antenna 11, a wireless signal processing unit 12, a baseband processing unit 13, a storage unit 14, and a control unit 15.

The antenna 11 radiates a wireless signal received from the wireless signal processing unit 12 into space for transmission to the base station 3 or other communication devices. Further, the antenna 11 receives a wireless signal from the base station 3 or other communication devices and passes it to the wireless signal processing unit 12.

The wireless signal processing unit 12 superimposes the baseband signal received from the baseband processing unit 13 onto a wireless signal having a radio frequency. Then, the wireless signal processing unit 12 amplifies the wireless signal by using an amplifier (not depicted) and outputs the amplified signal on the antenna 11. When a wireless signal is received from the base station 3 or other communication devices via the antenna 11, the wireless signal processing unit 12 amplifies the received signal by using the amplifier (not depicted). Then, the wireless signal processing unit 12 extracts the baseband signal superimposed on the wireless signal, and passes it to the baseband processing unit 13.

Figure 8:
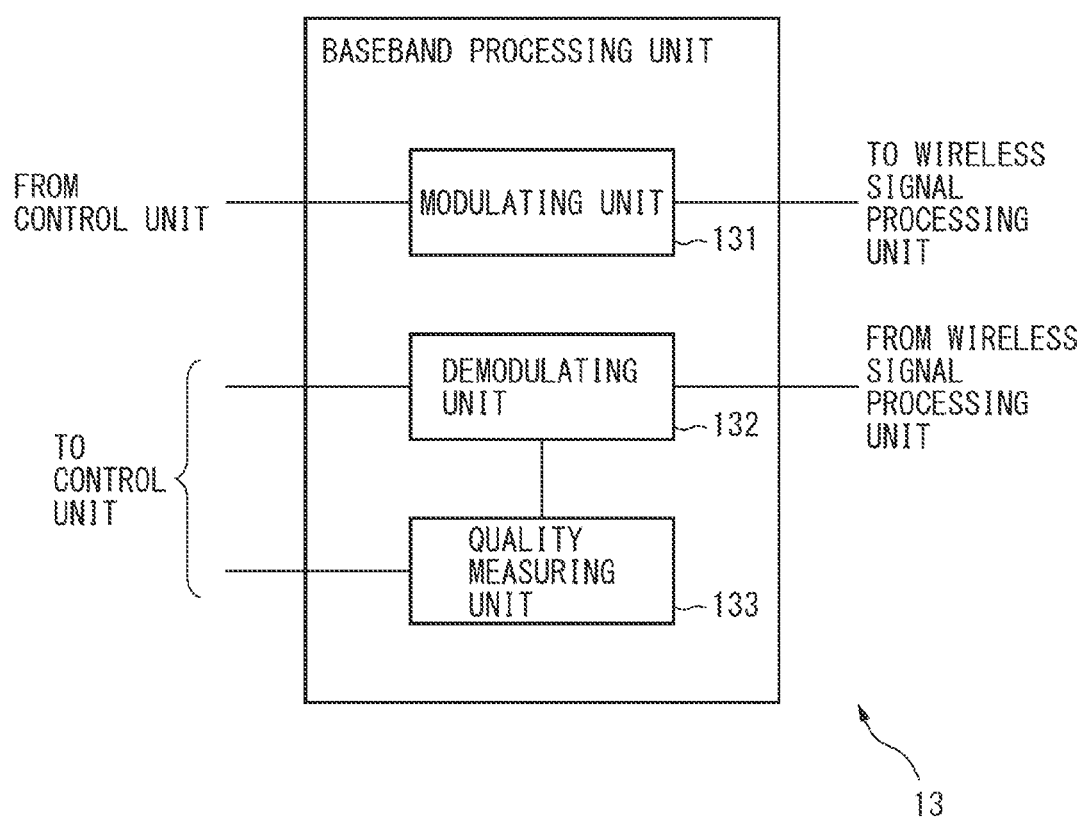
FIG. 8 is a functional block diagram of a baseband processing unit in the communication device.

FIG. 8 is a functional block diagram of the baseband processing unit 13. The baseband processing unit 13 includes a modulating unit 131, a demodulating unit 132, and a quality measuring unit 133. The modulating unit 131, the demodulating unit 132, and the quality measuring unit 133 are each implemented as an operational circuit incorporated in the baseband processing unit 13.

The modulating unit 131 receives a transmit signal from the control unit 15, and generates the baseband signal by modulating the transmit signal in accordance with a modulation scheme specified by the control unit 15. Any suitable modulation scheme employed in the communication standard to which the communication device 2-1 conforms may be used. The modulating unit 131 supplies the baseband signal to the wireless signal processing unit 12.

The demodulating unit 132 receives the baseband signal from the wireless signal processing unit 12, and recovers the received signal by demodulating it in accordance with the modulation scheme applied to the baseband signal. The demodulating unit 132 supplies the received signal to the control unit 15.

The quality measuring unit 133 measures the quality of the received signal by using, for example, the preamble field contained in the received signal. The quality measuring unit 133 determines the quality of the received signal by measuring, for example, the received signal strength indicator (RSSI) or the signal to interference ratio (SIR). Then, the quality measuring unit 133 supplies the measured value of the received signal quality to the control unit 15.

The storage unit 14 includes, for example, a read-only nonvolatile semiconductor memory circuit and a readable/writable volatile semiconductor memory circuit. The storage unit 14 stores a computer program to be executed by the control unit 15, data to be transmitted to the base station 3, or information, such as the number of requesting candidates, the identification information of the connecting communication device that transmitted the poll signal, etc., received from the base station 3 or other communication devices for communication purposes.

The control unit 15 includes, for example, one or a plurality of processors and their peripheral circuitry. The control unit 15 controls the wireless communications with the base station 3 or other communication devices. The control unit 15 generates the transmit signal containing information to be transmitted to the base station 3 or other communication devices, and supplies the transmit signal to the baseband processing unit 13. Further, the control unit 15 extracts information contained in the signal received from the base station 3 or other communication devices, and stores the information in the storage unit 14 or performs processing appropriate to the information.

Figure 9:
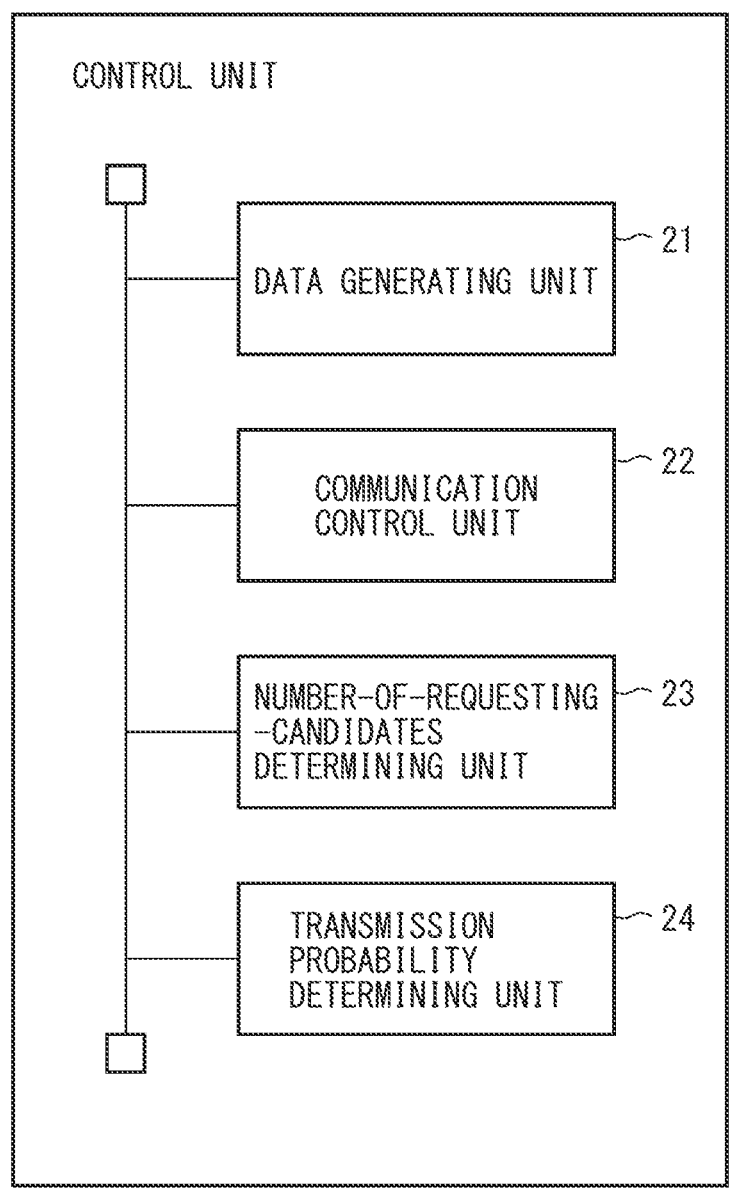
FIG. 9 is a functional block diagram of a control unit.

FIG. 9 is a functional block diagram of the control unit 15. The control unit 15 includes a data generating unit 21, a communication control unit 22, a number-of-requesting-candidates determining unit 23, and a transmission probability determining unit 24. These units constituting the control unit 15 are each implemented, for example, as a functional module by a computer program executed on a processor incorporated in the control unit 15. Alternatively, these units constituting the control unit 15 may each be implemented in firmware on the communication device 2-1.

The data generating unit 21 generates data to be included in the transmit signal. For this purpose, the data generating unit 21 acquires, for example, a measured value contained in a sensor signal from a sensor (for example, a thermometer or pulsimeter) incorporated in the communication device 2-1, and sets up the measured value as the data to be included in the transmit signal.

The communication control unit 22 performs communication control, such as the setting up, maintaining, and cutting off of a connection to the base station 3 or to other communication devices, in accordance, for example, with IEEE 802.15.6. For this purpose, the communication control unit 22 generates the transmit signal by including therein the data received from the data generating unit 21. The transmit signal may be generated in packet form conforming, for example, to IEEE 802.15.6. Further, the communication control unit 22 adds destination identification information, etc. in the header of the packet of the transmit signal.

The communication control unit 22 generates the packet of the transmit signal to be transmitted to the base station 3. In the event of failure to communicate with the base station 3 during the direct communication period, the communication control unit 22 generates a help signal as the transmit signal.

Further, when relaying a signal received from another communication device, the communication control unit 22 generates as the transmit signal a poll signal containing the number of requesting candidates received from the number-of-requesting-candidates determining unit 23 during the relay communication period.

During the direct communication period, the communication control unit 22 may output the transmit signal at each timing where the signal can be transmitted. On the other hand, during the relay communication period, the communication control unit 22 makes a decision, at each timing when the signal can be transmitted during the relay communication period, as to whether or not to output the transmit signal with the transmission probability signaled from the transmission probability determining unit 24. When a decision is made to output the transmit signal, the communication control unit 22 passes the transmit signal to the baseband processing unit 13.

Further, the communication control unit 22 analyzes the received signal to identify the type of the received signal. Then, the communication control unit 22 performs processing appropriate to the type of the received signal. For example, using a timer (not depicted), the communication control unit 22 measures the time elapsed after transmitting the transmit signal to the base station 3 in the direct communication period and, if an Ack signal is received from the base station 3 before the elapsed time reaches a predefined time, then determines that it has succeeded in communicating with the base station 3. On the other hand, if the received signal is a help signal, the communication control unit 22 notifies the number-of-requesting-candidates determining unit 23 that a help signal has been received.

The communication control unit 22 extracts various kinds of information contained in the received signal, and stores them in the storage unit 14. For example, when the received signal is a poll signal, the communication control unit 22 extracts the number of requesting candidates and the transmitting communication device identification information from the poll signal, and stores them in the storage unit 14.

When the communication device 2-1 has succeeded in communicating with the base station 3 during the direct communication period, the number-of-requesting-candidates determining unit 23 counts the number of help signals received during the help period on a superframe-by-superframe basis. Then, the number-of-requesting-candidates determining unit 23 determines the number of requesting candidates by taking the number of received help signals. The number-of-requesting-candidates determining unit 23 stores the number of requesting candidates in the storage unit 14 and notifies the communication control unit 22 of the number.

On the other hand, when the communication device 2-1 has failed to communicate with the base station 3 within the direct communication period, the transmission probability determining unit 24 determines the transmission probability in such a manner that the transmission probability decreases as the number of requesting candidates increases. In the present embodiment, the transmission probability determining unit 24 determines the transmission probability by taking the reciprocal of the number of requesting candidates. The transmission probability determining unit 24 notifies the communication control unit 22 of the transmission probability.

Figure 10:
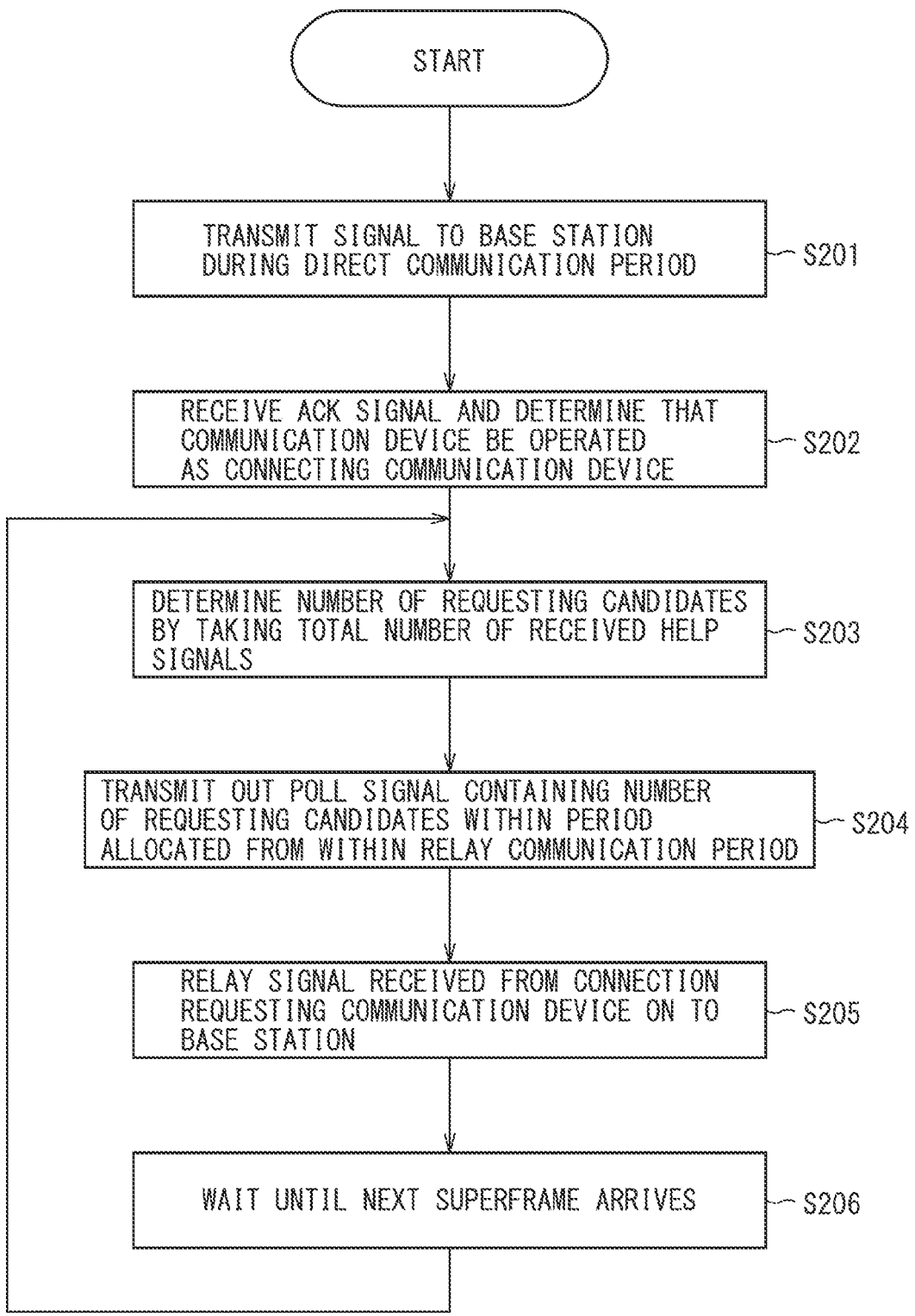
FIG. 10 is an operation flowchart illustrating the sequence of communication operations performed in a communication device operating as a connecting communication device.

FIG. 10 is an operation flowchart illustrating the sequence of communication operations performed in the communication device operating as the connecting communication device.

During the direct communication period, the communication control unit 22 generates a signal to be transmitted to the base station 3, and transmits out the signal via the wireless signal processing unit 12 and the antenna 11 within the period allocated to the communication device (step S201). When an Ack signal acknowledging the receipt of the signal is received from the base station 3, the communication control unit 22 determines that the communication device be operated as the connecting communication device (step S202).

The number-of-requesting-candidates determining unit 23 counts the number of help signals received during the help period, and determines the number of requesting candidates by taking the total number of received help signals (step S203). The number-of-requesting-candidates determining unit 23 stores the number of requesting candidates in the storage unit 14 and notifies the communication control unit 22 of the number.

The communication control unit 22 creates a poll signal containing the number of requesting candidates corresponding to the number of help signals, and transmits out the poll signal within the period allocated to the communication device from within the relay communication period (step S204). After that, the communication control unit 22 analyzes the signal received from the connection requesting communication device and, if the received signal is a signal to the base station 3, then creates the same signal as the received signal and transmits it out via the wireless signal processing unit 12 and the antenna 11. The communication control unit 22 thus relays the signal received from the connection requesting communication device on to the base station 3 (step S205). Then, the communication control unit 22 causes the communication device to wait until the relay communication period in the next superframe arrives (step S206).

The communication device repeats the process of steps S203 to S206 for each superframe until there is no longer any signal to be relayed from the connection requesting communication device to the base station. The communication device may determine the number of requesting candidates once every plurality of superframes. In this case, the communication device may repeat the process of steps S204 to S206 for each superframe until there is no longer any signal to be relayed from the connection requesting communication device to the base station.

Figure 11:
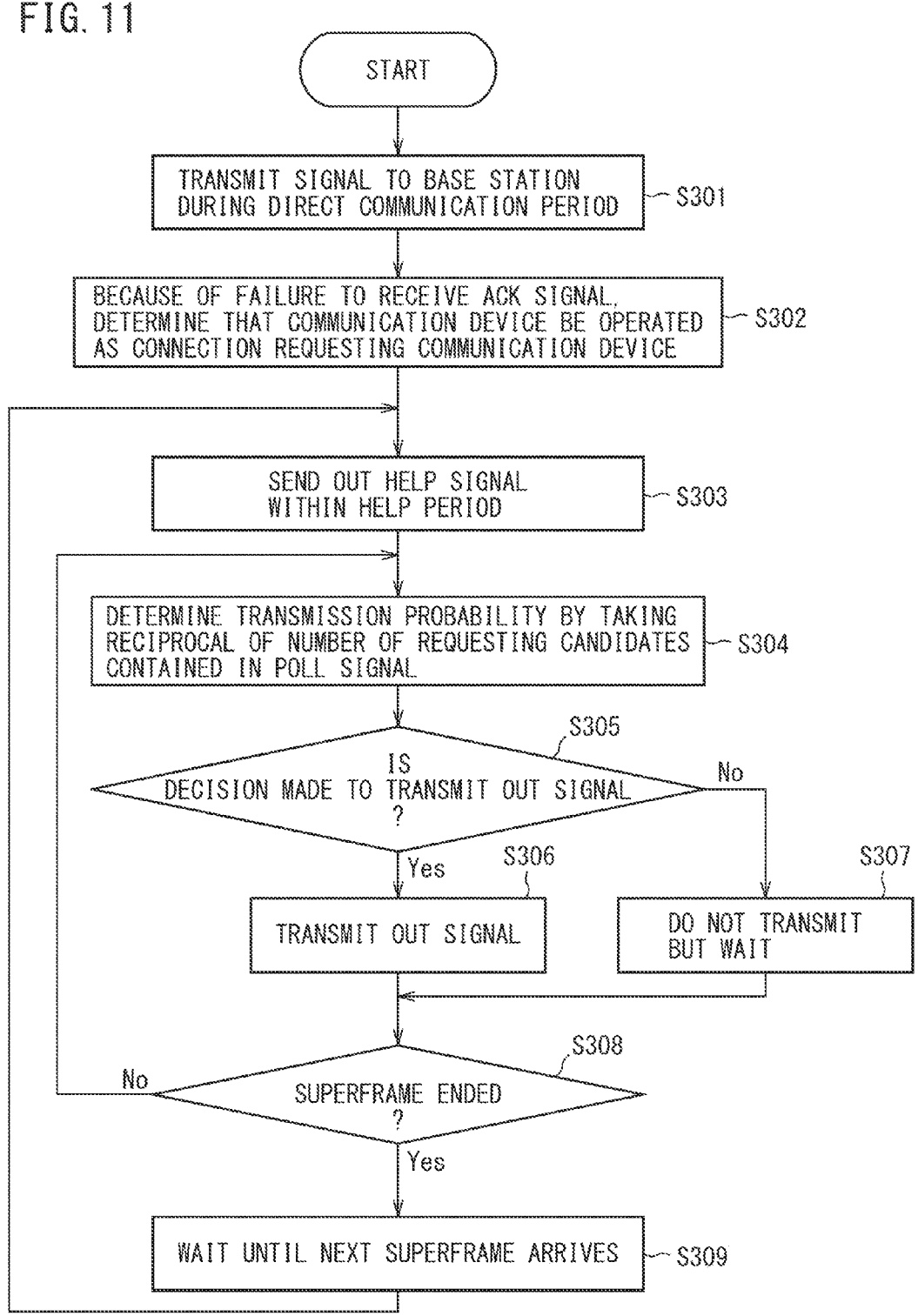
FIG. 11 is an operation flowchart illustrating the sequence of communication operations performed in a communication device operating as a connection requesting communication device.

FIG. 11 is an operation flowchart illustrating the sequence of communication operations performed in the communication device operating as the connection requesting communication device.

During the direct communication period, the communication control unit 22 generates a signal to be transmitted to the base station 3, and transmits out the signal via the wireless signal processing unit 12 and the antenna 11 within the period allocated to the communication device (step S301). When it is determined that the direct communication has failed because of a failure to receive an Ack signal acknowledging the receipt of the signal from the base station 3 within a predefined time interval, the communication control unit 22 determines that the communication device be operated as the connection requesting communication device (step S302).

The communication control unit 22 creates a help signal, and sends out the help signal within the help period (step S303). After that, the transmission probability determining unit 24 determines the transmission probability by taking the reciprocal of the number of requesting candidates contained in the poll signal received during the relay communication period (step S304). The transmission probability determining unit 24 then notifies the communication control unit 22 of the transmission probability.

The communication control unit 22 makes a decision as to whether or not to transmit the signal out directed to the base station 3 in accordance with the transmission probability (step S305). If a decision is made to transmit the signal out (Yes in step S305), the communication control unit 22 transmits out the signal (step S306). On the other hand, if a decision is made not to transmit the signal out (No in step S305), the communication control unit 22 waits until the next poll signal is received (step S307).

After step S306 or S307, the communication control unit 22 checks to see if the current superframe has ended (step S308). If the current superframe has not ended yet (No in step S308), the communication device repeats the process of steps S304 to S307. On the other hand, if the current superframe has ended (Yes in step S308), the communication control unit 22 waits until the next superframe arrives (step S309). Thereafter, the communication device repeats the process of steps S303 to S309.

Next, the details of the base station 3 will be described.

Figure 12:
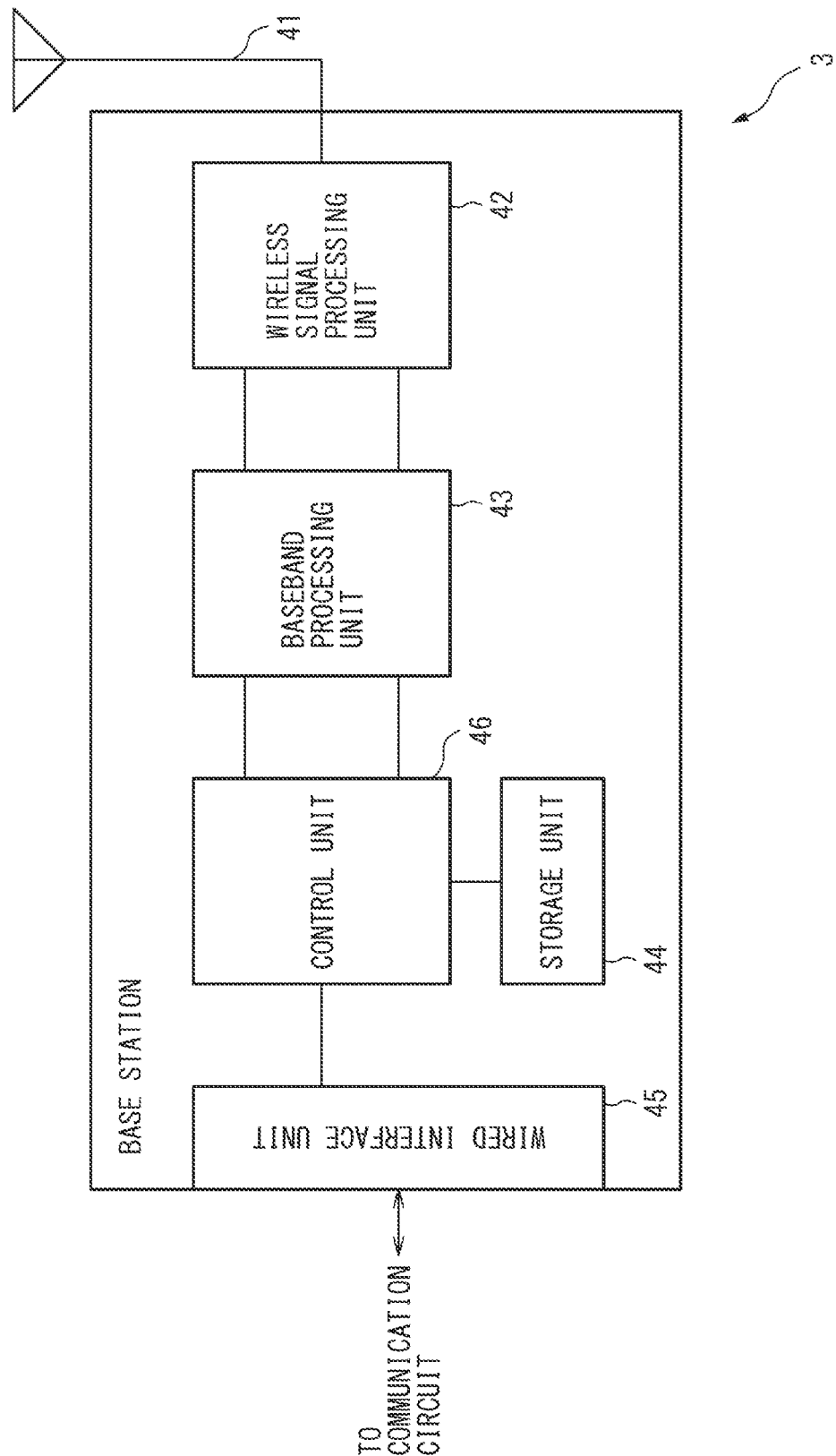
FIG. 12 is a diagram schematically illustrating the configuration of a base station.

FIG. 12 is a diagram schematically illustrating the configuration of the base station 3. The base station 3 includes an antenna 41, a wireless signal processing unit 42, a baseband processing unit 43, a storage unit 44, a wired interface unit 45, and a control unit 46. Of these component elements, the antenna 41 and the wireless signal processing unit 42 are identical in configuration and function to the corresponding component elements of the communication device 2-1. Accordingly, the baseband processing unit 43, the storage unit 44, the wired interface unit 45, and the control unit 46 will be described below.

Figure 13:
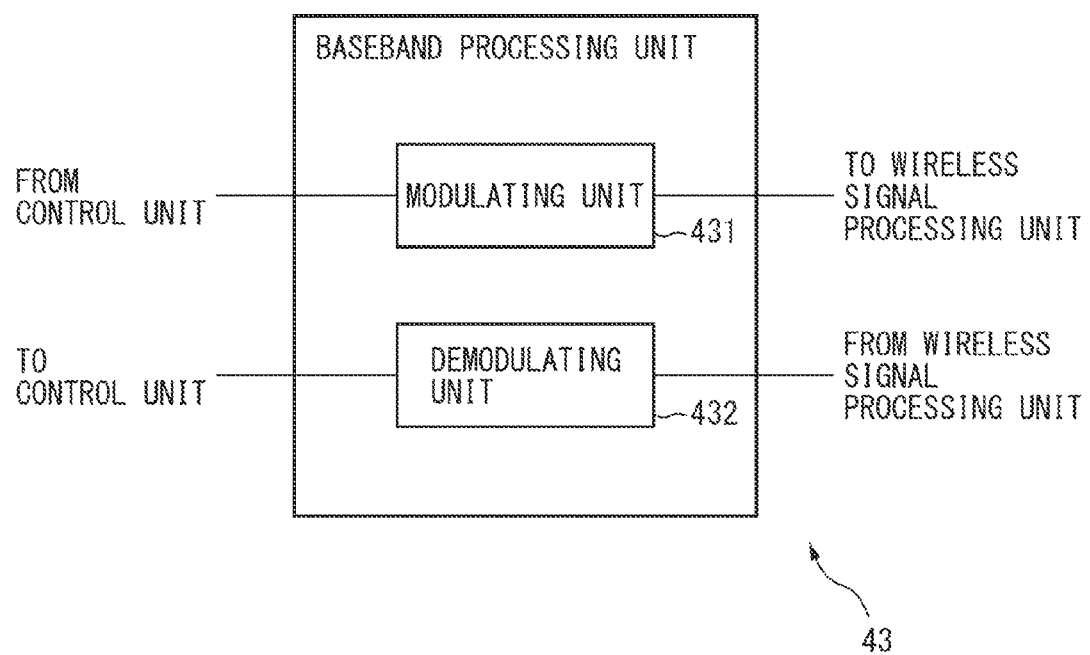
FIG. 13 is a functional block diagram of a baseband processing unit in the base station.

FIG. 13 is a functional block diagram of the baseband processing unit 43. The baseband processing unit 43 includes a modulating unit 431 and a demodulating unit 432. The modulating unit 431 and the demodulating unit 432 are each implemented as an operational circuit incorporated in the baseband processing unit 43.

The modulating unit 431 receives a transmit signal from the control unit 46, and generates the baseband signal by modulating the transmit signal in accordance with a modulation scheme specified by the control unit 46. Any suitable modulation scheme employed in the communication standard to which the base station 3 conforms may be used. The modulating unit 431 supplies the baseband signal to the wireless signal processing unit 42.

The demodulating unit 432 receives the baseband signal from the wireless signal processing unit 42, and recovers the received signal by demodulating it in accordance with the modulation scheme applied to the baseband signal. The demodulating unit 432 supplies the received signal to the control unit 46.

Similarly to the baseband processing unit in the communication device, the baseband processing unit 43 may include a quality measuring unit for measuring the quality of the received signal.

The storage unit 44 includes, for example, a read-only nonvolatile semiconductor memory circuit and a readable/writable volatile semiconductor memory circuit. The storage unit 44 stores a computer program to be executed by the control unit 46, data extracted from the signal received from each communication device, or information used for performing communication with each communication device.

The wired interface unit 45 includes an interface circuit at which is terminated a wired communication circuit (not depicted) to which the base station 3 is connected. The wired interface unit 45 outputs data, etc. received from the control unit 46 onto the communication circuit for transmission to other apparatus. Further, the wired interface unit 45 receives information from such other apparatus via the communication circuit, and passes it to the control unit 46.

The control unit 46 includes, for example, one or a plurality of processors and their peripheral circuitry. The control unit 46 controls the communications with the communication devices. For this purpose, the control unit 46, for example, creates broadcast information containing a synchronization signal, etc. and outputs the broadcast information via the wireless signal processing unit 42 and the antenna 41 on a superframe-by-superframe basis. The control unit 46 may also perform processing appropriate to the data contained in the signal received from any one of the communication devices. Further, the control unit 46 may transmit the data contained in the signal received from any one of the communication devices to other apparatus via the wired interface unit 45.

As has been described above, in the wireless communication system, the connection requesting communication device determines the transmission probability by taking the reciprocal of the number of requesting candidates contained in the poll signal delivered from the connecting communication device. Then, the connection requesting communication device makes a decision as to whether or not to transmit a signal to the connecting communication device in accordance with the transmission probability. In this way, the wireless communication system can not only reduce the chance of incurring congestion at the connecting communication device but can also prevent the waiting time for signal transmission at the connection requesting communication device from needlessly increasing. As a result, the wireless communication system can shorten the time that each communication device takes to succeed in communicating with the base station.

In the above embodiment, each connection requesting communication device can transmit a help signal at any time desired during the help period. This can lead to a situation where a plurality of help signals contend at the connecting communication device which becomes unable to count the number of help signals received. In view of this, in a modified example, the connecting communication device, in the event of an inability to count the number of help signals received, may create the poll signal by including in the receiving device identification information a bit string (for example, 0x0) that indicates that the number of requesting candidates is plural.

Figure 14:
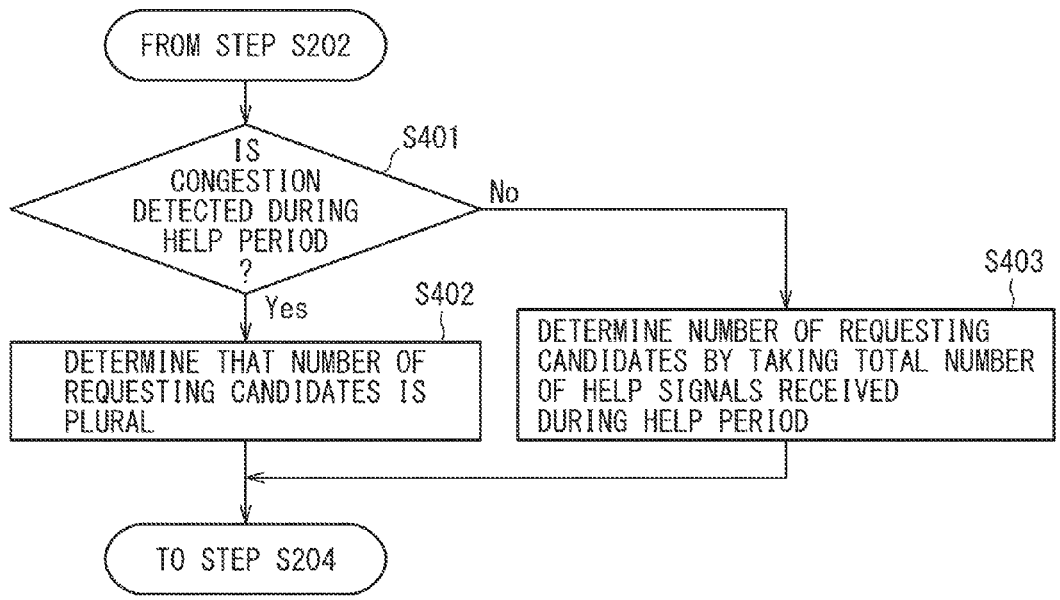
FIG. 14 is an operation flowchart illustrating the sequence of communication operations performed in a communication device operating as a connecting communication device according to a modified example.

FIG. 14 is an operation flowchart illustrating the sequence of communication operations performed in the connecting communication device according to such a modified example. The only difference between the operation flowchart of the modified example and the operation flowchart of FIG. 10 is the processing performed in step S203; therefore, the processing performed instead of that performed in step S203 will be described below with reference to FIG. 14.

After step S202 in the operation flowchart of FIG. 10, the number-of-requesting-candidates determining unit 23 in the connecting communication device determines whether congestion is detected during the help period (step S401). For example, if the RSSI of the signal received during the help period is not lower than a predetermined threshold value, and if it is determined based on the FCS of the received signal that it is not possible to reproduce the received signal, then the number-of-requesting-candidates determining unit 23 determines that congestion has occurred. The threshold value for the RSSI may be set, for example, to the lower limit value of the RSSI when a plurality of help signals are received simultaneously.

If congestion is detected during the help period (Yes in step S401), the number-of-requesting-candidates determining unit 23 determines that the number of requesting candidates is plural (step S402). On the other hand, if congestion is not detected during the help period (No in step S401), the number-of-requesting-candidates determining unit 23 determines the number of requesting candidates by taking the number of help signals received during the help period (step S403). After step S402 or S403, the control unit 15 in the connecting communication device proceeds to carry out step S204 and subsequent steps in the operation flowchart of FIG. 10.

Figure 15:
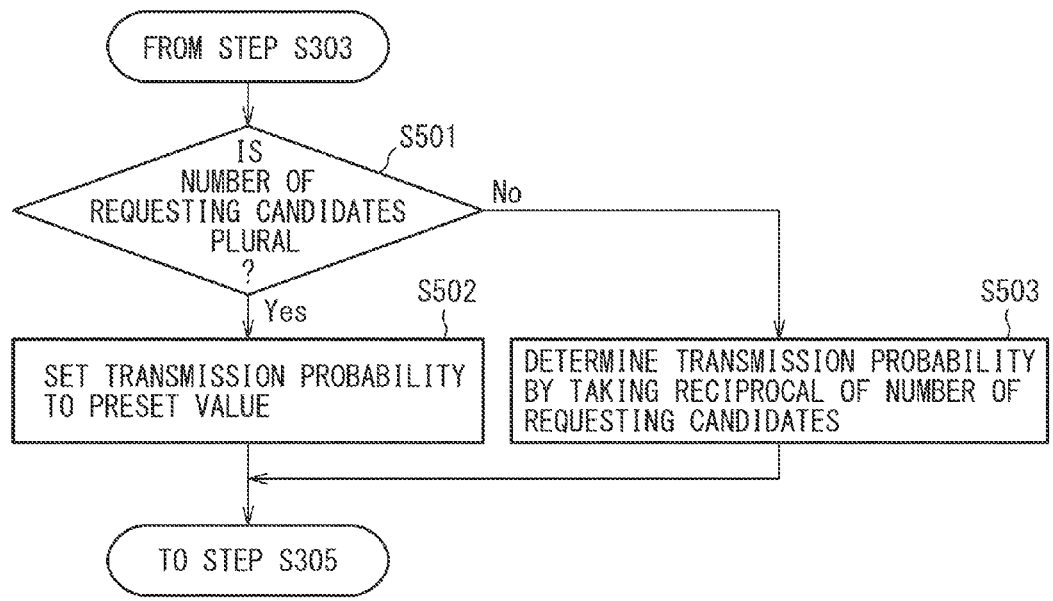
FIG. 15 is an operation flowchart illustrating the sequence of communication operations performed in a communication device operating as a connection requesting communication device according to the modified example.

FIG. 15 is an operation flowchart illustrating the sequence of communication operations performed in the connection requesting communication device according to the above modified example. The only difference between the operation flowchart of the modified example and the operation flowchart of FIG. 11 is the processing performed in step S304; therefore, the processing performed instead of that performed in step S304 will be described below with reference to FIG. 15.

After step S303 in the operation flowchart of FIG. 11, the transmission probability determining unit 24 in the connection requesting communication device checks to see if the number of requesting candidates contained in the poll signal delivered from the connecting communication device is plural (step S501). If the number of requesting candidates contained in the poll signal is plural (Yes in step S501), the transmission probability determining unit 24 sets the transmission probability to a preset value (for example, ½ or ⅓) (step S502). On the other hand, if the number of requesting candidates contained in the poll signal designates a specific number (No in step S501), the transmission probability determining unit 24 determines the transmission probability by taking the reciprocal of the number of requesting candidates (step S503). After step S502 or S503, the control unit 15 in the connection requesting communication device proceeds to carry out step S305 and subsequent steps in the operation flowchart of FIG. 11.

If the transmission probability is set to a preset value, then at the first signal transmit timing within the relay communication period, the connection requesting communication device makes a decision as to whether or not the signal is to be transmitted out with the preset transmission probability. Then, if a decision is made not to transmit the signal out at the first signal transmit timing, or if communication with the base station 3 has failed, the transmission probability determining unit 24 in the connection requesting communication device may set the transmission probability for the next signal transmit timing lower than that for the previous signal transmit timing. In this case, the transmission probability determining unit 24 may set the transmission probability for the next signal transmit timing by multiplying the transmission probability for the previous signal transmit timing by a predetermined number smaller than 1 (for example, by ½). Then, the transmission probability determining unit 24 decreases the transmission probability for each signal transmit timing until succeeding in communicating with the base station 3 or until the relay communication period ends.

According to the above modified example, if congestion occurs due to simultaneous arrivals of help signals at the connecting communication device, the communication system can decrease the transmission probability at the connection requesting communication device requesting the connecting communication device to relay the signal. In this way, the communication system can reduce the chance of incurring congestion at the connecting communication device during the relay communication period.

According to another modified example, a different communication channel may be allocated to each communication device in order to prevent congestion from occurring at the connecting communication device. For example, the communication channel that each communication device can use for help signal transmission may be specified in the broadcast information or the like to be transmitted at the head of the superframe from the base station 3. Then, the communication device that operates as the connection requesting communication device as a result of a failure to transmit a signal directly to the base station 3 sends the help signal by using the specified communication channel.

Figure 16:
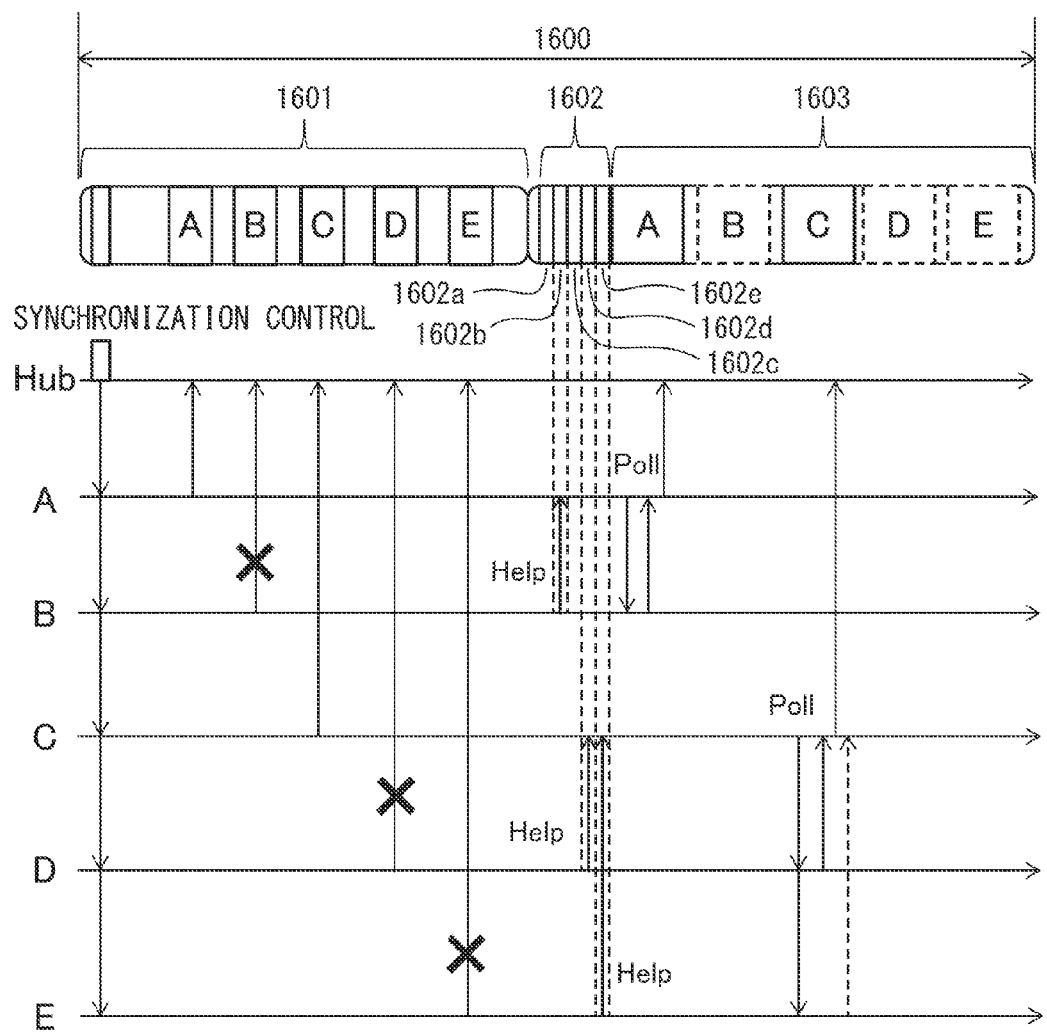
FIG. 16 is a diagram illustrating one example of a superframe in which a help period is time-divided.

The communication channel may be allocated as a time slot obtained by time-dividing the help period. FIG. 16 is a diagram illustrating one example of a superframe in which the help period is time-divided. In FIG. 16, the horizontal axis represents the time. For convenience, in FIG. 16, the base station 3 is designated Hub, and the communication devices 2-1 to 2-5 are designated A to E, respectively. Each arrow indicates a signal transmitted between communication devices or transmitted from a given one of the communication devices to the base station.

The superframe 1600 includes a direct communication period 1601, a help period 1602, and a relay communication period 1603. In this modified example, the help period 1602 is time-divided into five time slots 1602a to 1602e. Each of the communication devices 2-1 to 2-5 can use one time slot allocated in advance from among the time slots 1602a to 1602e.

For example, suppose that the communication devices 2-2, 2-4, and 2-5 failed to communicate with the base station 3 during the direct communication period 1601; then, the communication device 2-2 sends out the help signal in the time slot 1602b. Likewise, the communication device 2-4 sends out the help signal in the time slot 1602d. The communication device 2-5 sends out the help signal in the time slot 1602e. Accordingly, if help signals from two or more of the communication devices 2-2, 2-4, and 2-5 are received at any one of the communication devices 2-1 and 2-3 operating as the connecting communication devices, congestion due to the arrival of such help signals does not occur because the receive timing is different for each help signal. Therefore, the communication devices 2-1 and 2-3 can count the number of received help signals accurately and can correctly set the number of requesting candidates. As a result, the communication devices 2-2, 2-4, and 2-5 requesting the connecting communication devices to relay the signals to the base station 3 can set the appropriate transmission probability during the relay communication period 1603.

Other types of multiplexing technique may be employed to allocate a communication channel to each communication device during the help period. For example, a different frequency may be allocated as a communication channel to each communication device by frequency-division multiplexing. Alternatively, a different communication channel may be set for each communication device by using a code-division multiple access technique.

According to still another modified example, a help period may be set for each connecting communication device, rather than setting one common help period for all the communication devices within the superframe. For example, each connecting communication device broadcasts a timed poll signal during the relay communication period, and the help period specified by the timed poll signal may be provided immediately following the transmission of the timed poll signal. The timed poll signal is a poll signal used to transmit control information, such as synchronization control information and data transmission time, necessary for initiating communication with the connecting communication device. Further, the connecting communication device may set the help period only when congestion was detected during the relay communication period in the previous superframe. In this case, since the help period can be provided only when signal contention is likely to occur, the connecting communication device can make effective use of the period allocated to itself.

Figure 17:
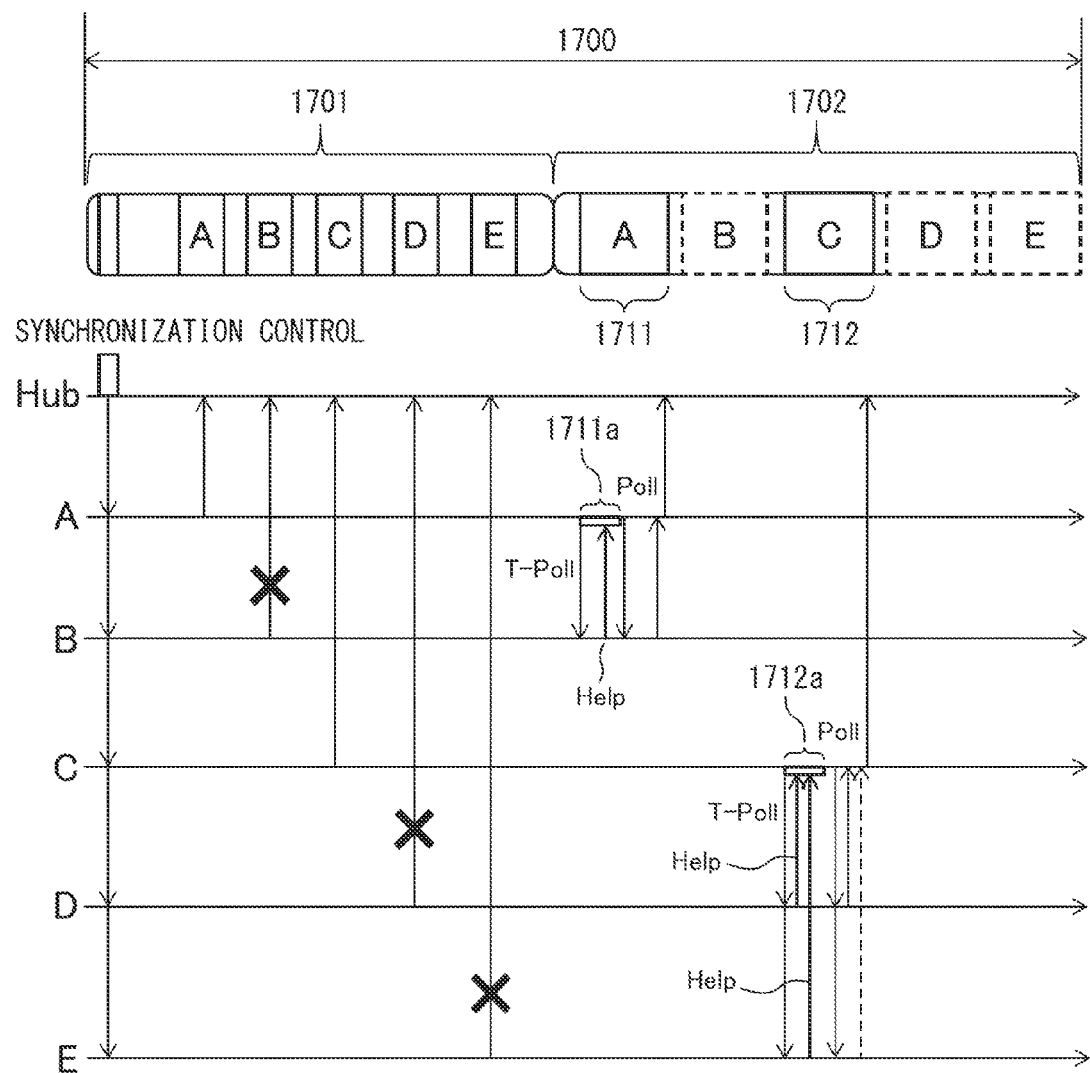
FIG. 17 is a diagram illustrating one example of a superframe in which a help period is set for each connecting communication device according to another modified example.

FIG. 17 is a diagram illustrating one example of a superframe in which a help period is set for each connecting communication device according to such a modified example. In FIG. 17, the horizontal axis represents the time. For convenience, in FIG. 17, the base station 3 is designated Hub, and the communication devices 2-1 to 2-5 are designated A to E, respectively. Each arrow indicates a signal transmitted between communication devices or transmitted from a given one of the communication devices to the base station.

The superframe 1700 includes a direct communication period 1701 and a relay communication period 1702.

For example, suppose that the communication devices 2-1 and 2-3 succeeded in communicating with the base station 3 during the direct communication period 1701 but the communication devices 2-2, 2-4, and 2-5 failed to communicate with the base station 3. In this case, the communication device 2-1 broadcasts a timed poll signal during a period 1711 allocated to itself from within the relay communication period 1702. Then, the communication device 2-2 that was able to receive the timed poll signal sends out a help signal during a help period 1711a specified by the timed poll signal. Then, after the end of the help period 1711a, the communication device 2-1 sends a poll signal containing the number of requesting candidates corresponding to the number of help signals received. The communication device 2-2 that received the poll signal makes a decision as to whether or not to effect the transmission of a signal directed to the base station 3 in accordance with the transmission probability determined based on the number of requesting candidates contained in the poll signal.

Likewise, the communication device 2-3 broadcasts a timed poll signal during a period 1712 allocated to itself from within the relay communication period 1702. Then, the communication devices 2-4 and 2-5 that were able to receive the timed poll signal each send out a help signal during a help period 1712a specified by the timed poll signal. Then, after the end of the help period 1712a, the communication device 2-3 sends a poll signal containing the number of requesting candidates corresponding to the number of help signals received. The communication devices 2-4 and 2-5 that received the poll signal each make a decision as to whether or not to effect the transmission of a signal directed to the base station 3 in accordance with the transmission probability determined based on the number of requesting candidates contained in the poll signal.

According to the above modified example, since the help period is set for each connecting communication device, and since only the communication device that was able to receive the timed poll signal from the connecting communication device sends out a help signal, the number of communication devices that are likely to send out help signals simultaneously can be reduced. As a result, the wireless communication system according to the above modified example can reduce the chance of incurring congestion due to simultaneous arrivals of help signals at the connecting communication device.

According to a further modified example, the connection requesting communication device may receive a plurality of poll signals during the relay communication period in the superframe. In that case, the connection requesting communication device may wait until the arrival of the relay communication period in the next superframe and then transmit the signal out directed to the base station 3 during the period allocated to the connecting communication device that broadcasted the poll signal containing the smallest number of requesting candidates. In this case, the connection requesting communication device receives the poll signals, but does not transmit the signal out directed to the base station 3, for example, in the relay communication period provided in the superframe where the help signal was sent out. Then, the communication control unit 22 in the connection requesting communication device stores in the storage unit 14 the number of requesting candidates contained in each poll signal and the identification information of the communication device from which each poll signal was received. Then, the transmission probability determining unit 24 in the connection requesting communication device determines the transmission probability by taking the reciprocal of the smallest number of requesting candidates among the numbers of requesting candidates contained in the received poll signals.

If the received poll signals include a poll signal which does not designate any specific number for the number of requesting candidates but just indicates that the number is plural, the transmission probability determining unit 24 determines the smallest number of requesting candidates by setting the number of requesting candidates to a preset number "n" for such a poll signal. Preferably, "n" is set to a value larger than 2 but smaller than 3. The reason is that, usually, congestion at the connecting communication device occurs due to contention between signals arriving from two communication devices. If the expected value of the number of signals expected to cause contention is known in advance through a test or simulation conducted at the time of the network installation, "n" may be set equal to the expected value.

FIG. 18 is a diagram illustrating one example of a superframe according to the above modified example. In this modified example, it is assumed that the communication system contains four communication devices 2-1 to 2-4. In FIG. 18, the horizontal axis represents the time. For convenience, in FIG. 18, the base station 3 is designated Hub, and the communication devices 2-1 to 2-4 are designated A to D, respectively. Each arrow indicates a signal transmitted between communication devices or transmitted from a given one of the communication devices to the base station.

The superframe 1800 includes a direct communication period 1801, a help period 1802, and a relay communication period 1803.

For example, suppose that the communication devices 2-1 and 2-3 succeeded in communicating with the base station 3 during the direct communication period 1801 but the communication devices 2-2 and 2-4 failed to communicate with the base station 3. Then, suppose that the communication device 2-1 received a help signal from the communication device 2-2 during the help period 1802, on the other hand, the communication device 2-3 received help signals from both of the communication devices 2-2 and 2-4. In this case, the communication device 2-1 sends out a poll signal containing the number, 1, of requesting candidates during a period allocated to the communication device 2-1 from within the relay communication period 1803. On the other hand, the communication device 2-3 sends out a poll signal containing the number, 2, of requesting candidates during a period allocated to the communication device 2-3 from within the relay communication period 1803. Then, the communication device 2-2 receives the poll signal from the communication device 2-1 and the poll signal from the communication device 2-3. On the other hand, the communication device 2-4 receives the poll signal from the communication device 2-3.

In this case, the communication device 2-2 makes a decision to transmit a signal to the base station 3 via the communication device 2-1 from which the poll signal indicates the smaller number of requesting candidates. Then, the communication device 2-2 transmits out the signal during the period allocated to the communication device 2-1 from within the relay communication period 1803 in the next superframe. On the other hand, the communication device 2-4 that received the poll signal only from the communication device 2-3 transmits out the signal during the period allocated to the communication device 2-3 from within the relay communication period 1803 in the next superframe.

Figure 19:
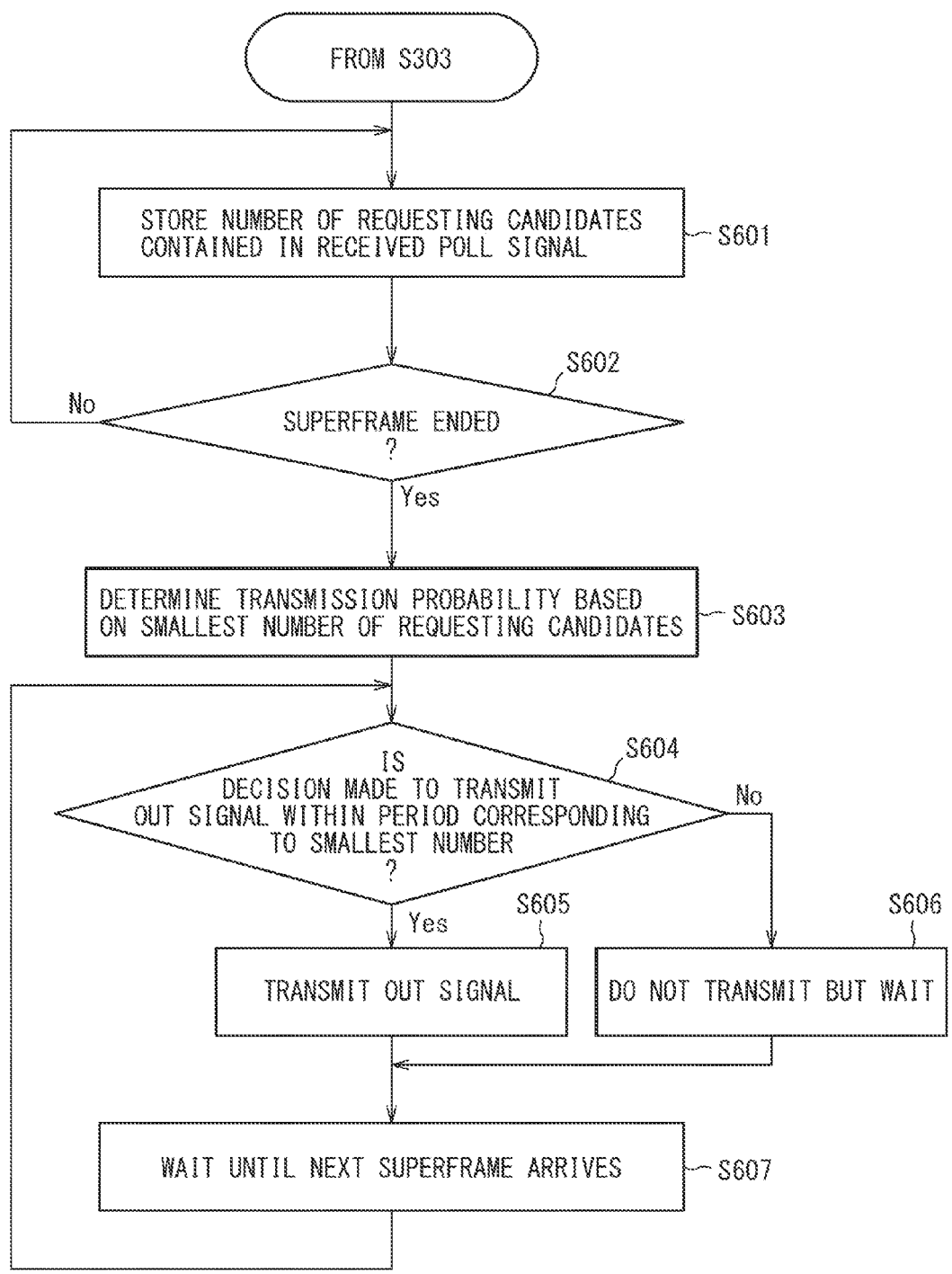
FIG. 19 is an operation flowchart illustrating the sequence of communication operations performed in the connection requesting communication device according to the further modified example.

FIG. 19 is an operation flowchart illustrating the sequence of communication operations performed in the connection requesting communication device according to the above modified example. The only difference between the operation flowchart of this modified example and the operation flowchart of FIG. 11 lies in the process from step S304 onward; therefore, the process performed instead of that performed from step S304 onward will be described below with reference to FIG. 19.

When a poll signal is received, the communication control unit 22 stores the number of requesting candidates contained in the poll signal into the storage unit 14 along with the identification information of the connecting communication device from which the poll signal was received (step S601). Then, the communication control unit 22 checks to see if the current superframe has ended (step S602). If the current superframe has not ended yet (No in step S602), the communication control unit 22 returns to step S601 to repeat the same process. On the other hand, if the current superframe has ended (Yes in step S602), the transmission probability determining unit 24 obtains the smallest number of requesting candidates, and sets the transmission probability by taking the reciprocal of the smallest number (step S603). Then, the transmission probability determining unit 24 passes the transmission probability to the communication control unit 22, along with the identification information of the connecting communication device from which the poll signal containing the smallest number of requesting candidates was received.

By referring to the identification information of the connecting communication device supplied from the transmission probability determining unit 24, the communication control unit 22 identifies the period allocated to the connecting communication device from within the relay communication period provided in the superframe that follows the superframe where the help signal was sent out. Then, the communication control unit 22 makes a decision as to whether or not to transmit a signal out at the transmit timing within that period in accordance with the transmission probability determined by the transmission probability determining unit 24 (step S604). If a decision is made to transmit the signal out (Yes in step S604), the communication control unit 22 transmits out the signal (step S65). On the other hand, if a decision is made to not transmit the signal out (No in step S604), the communication control unit 22 does not transmit the signal out but waits (step S606).

After step S605 or S606, the communication control unit 22 waits until the next superframe arrives (step S607), and thereafter, the process from step S604 onward is repeated.

According to the above modified example, since the connection requesting communication device selects the connecting communication device at which signal contention is least likely to occur, and requests the selected connecting communication device to replay the signal, the chance of incurring congestion at the connecting communication device can be reduced. Furthermore, according to the above modified example, the wireless communication system can prevent the occurrence of a situation where one connection requesting communication device is connected to the base station 3 via a plurality of connecting communication devices, making the other connection requesting communication device unable to use the connecting communication devices and hence unable to communicate with the base station 3.

According to a still further modified example, when transmitting a poll signal indicating the number of requesting candidates, the connecting communication device may include, in the poll signal, not only the number of requesting candidates but also the identification information of each connection requesting communication device from which the help signal is received.

Figure 20:
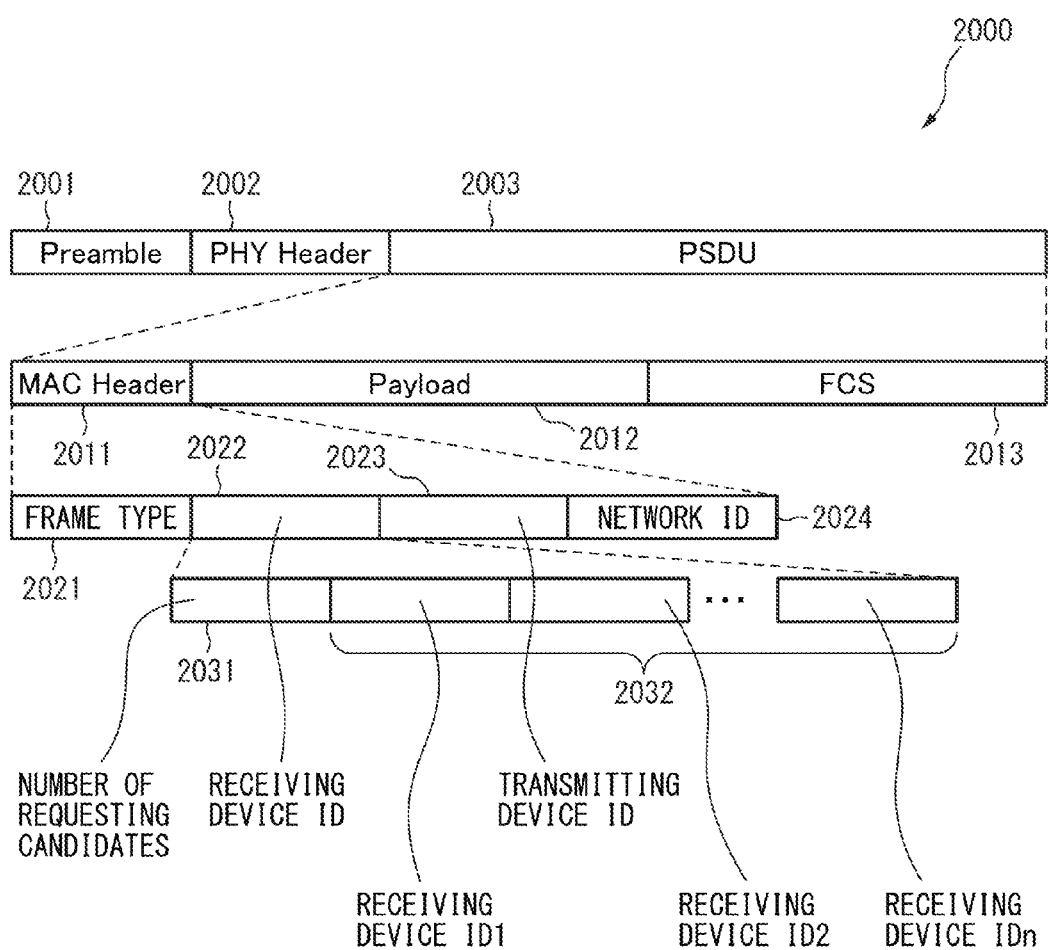
FIG. 20 is a diagram illustrating the structure of a poll signal according to a still further modified example.

FIG. 20 is a diagram illustrating the structure of the poll signal according to the above modified example. The poll signal 2000 is generated in the same packet format as that of the poll signal depicted in FIG. 5, and includes, in order from the top, a preamble field 2001, a physical layer header field 2002, and a PSDU field 2003. The PSDU field 2003 includes a MAC header 2011, a payload 2012, and an FCS 2013. The MAC header 2011 includes a frame type 2021, identification information 2022 identifying the receiving communication device, identification information 2023 identifying the communication device transmitting the poll signal 2000, and identification information 2024 identifying the network to which the communication device transmitting the poll signal 2000 is attached. In the poll signal 2000, the frame type 2021 carries a bit string that indicates that the frame type is the poll signal. The frame type 2021 may carry a different bit string when the identification information 2022 of the receiving communication device contains only the number of requesting candidates than when it contains the identification information of the help signal transmitting device along with the number of requesting candidates. Further, in the poll signal 2000, the identification information 2022 of the receiving communication device includes a bit string 2031 indicating the number of requesting candidates and identification information 2032 identifying each communication device from which a help signal was received.

The transmission probability determining unit 24 in the connection requesting communication device checks to see if its identification information is carried in the poll signal. If its identification information is carried in the poll signal, the transmission probability determining unit 24 sets the transmission probability by taking the reciprocal of the number of requesting candidates contained in that poll signal. On the other hand, if its identification information is not carried in the poll signal, the transmission probability determining unit 24 discards the poll signal. Then, the connection requesting communication device may hold off transmitting a signal to the base station 3 until the next poll signal is received.

The transmission probability determining unit 24 in the connection requesting communication device may also discard the poll signal if the poll signal carries identification information of another communication device whose QoS is higher than the QoS of the connection requesting communication. Then, the connection requesting communication device may hold off transmitting a signal to the base station 3 until the next poll signal is received. In this way, the wireless communication system can give higher priority to the communication from a higher QoS communication device than the communication from a lower QoS communication device.

In order to enable each communication device to know the QoSs of the other communication devices, the QoS of each communication device may be included, for example, in the broadcast information to be transmitted to each communication device. Alternatively, the connection requesting communication device may include the QoS of itself in the help signal, and the connecting communication device may include in the poll signal the QoS carried in the received help signal by associating the QoS with the identification information of the connection requesting communication device from which the help signal was received.

According to the above modified example, since the connection requesting communication device can request the connecting communication device receiving the signal from the connection requesting communication device to relay the signal to the base station, successful communication with the base station can be achieved in a reliable manner.

According to yet another modified example, the configuration of the communication device as the connection requesting communication device and the configuration of the communication device as the connecting communication device may be made different from each other. In this case, the communication device operating as the connection requesting communication device need only implement the functions of the data generating unit 21, communication control unit 22, and transmission probability determining unit 24. On the other hand, the communication device operating as the connecting communication device need only implement the functions of the communication control unit 22 and number-of-requesting-candidates determining unit 23.

Further, each communication device may set up a help period by sending a T-poll signal during the relay communication period when it is powered up, and may determine the number of requesting candidates based on the number of help signals received during the help period. Then, the communication device may send out a poll signal containing the number of requesting candidates during the relay communication period provided in the superframe during which a successful connection with the base station is maintained.

Furthermore, if the base station does not set up a communication channel individually for each communication device, the base station itself may be made to operate as the connecting communication device. In this case, the control unit in the base station should preferably be configured to implement the functions equivalent to those of the communication control unit 22 and number-of-requesting-candidates determining unit 23 in the communication device according to the above embodiment or any one of the above modified examples.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A communication method for use in a communication system including a plurality of communication devices, the communication method comprising:

transmitting, by a first communication device of the plurality of communication devices, within a predefined period a connection request signal requesting a connection with another communication device of the plurality of communication devices;

transmitting, by a second communication device of the plurality of communication devices, a connection permit signal which contains the number of connection request signals received during the predefined period as the number of requesting candidates indicating the number of signals likely to contend at the second communication device;

obtaining, by the first communication device, a transmission probability defining the probability of signal transmission such that the transmission probability decreases as the number of requesting candidates contained in the connection permit signal received from the second communication device increases; and determining, by the first communication device, whether or not to transmit a signal to be relayed by the second communication device out in accordance with the transmission probability at the timing that the signal can be transmitted to the second communication device, wherein when the first communication device has received a plurality of the connection permit signals from a plurality of the second communication devices, obtaining the transmission probability includes determining, by the first communication device, the transmission probability based on the smallest of the numbers of requesting candidates contained in the respective connection permit signals, and determination of whether or not to transmit the signal out includes determining, by the first communication device, whether or not to transmit the signal out at the timing that the signal can be transmitted to the second communication device corresponding to the smallest number of requesting candidates.

2. The communication method according to claim 1, further comprising including, by the second communication device, in the connection permit signal, information indicating that the number of requesting candidates is plural when congestion of the connection request signals is detected during the predefined period, and wherein obtaining the transmission probability includes setting, by the first communication device, the transmission probability to a preset probability when the information indicating that the number of requesting candidates is plural is included in the connection permit signal.

3. The communication method according to claim 1, wherein a different communication channel is allocated to each of the plurality of communication devices in the predefined period.

4. The communication method according to claim 1, further comprising transmitting, by the second communication device, a period setup signal for setting up the predefined period along with control information necessary for initiating communication with the second communication device, and wherein transmitting the connection request signal includes transmitting the connection request signal within the predefined period specified by the period setup signal.

5. The communication method according to claim 1, further comprising including, by the second communication device, in the connection permit signal, identification information identifying the communication device that transmitted the connection request signal among the plurality of communication devices, and wherein when the identification information of the first communication device is not included in the connection permit signal, determination of whether or not to transmit the signal out includes not transmitting out, by the first communication device, the signal at the timing that the signal can be transmitted to the second communication device from which the connection permit signal was received, and when the identification information of the first communication device is included in the connection permit signal, determination of whether or not to transmit the signal out includes determining, by the first communication device, whether or not to transmit the signal out in accordance with the transmission probability at the timing that the signal can be transmitted to the second communication device from which the connection permit signal was received.

6. A communication system comprising:

a plurality of connecting communication devices, each of which transmits a connection permit signal containing the number of requesting candidates indicating the number of signals likely to contend at the connecting communication device; and a connection requesting communication device which obtains a transmission probability defining the probability of signal transmission such that the transmission probability decreases as the number of requesting candidates contained in the connection permit signal received from the connecting communication device increases, and determines whether or not to transmit a signal to be relayed by the connecting communication device out in accordance with the transmission probability at the timing that the signal can be transmitted to a connecting communication device among the plurality of connecting communication devices from which the connection permit signal was received, wherein when the connection requesting communication device has received a plurality of the connection permit signals from the plurality of the connecting communication devices, the connection requesting communication device determines the transmission probability based on the smallest of the numbers of requesting candidates contained in the respective connection permit signals, and the connection requesting communication device makes a decision as to whether or not to transmit the signal out at the timing that the signal can be transmitted to the connecting communication device corresponding to the smallest number of requesting candidates.

7. The communication system according to claim 6, wherein the connection requesting communication device transmits within a predefined period a connection request signal requesting a connection to the connecting communication device, and each of the plurality of connecting communication devices determines the number of requesting candidates by taking the number of connection request signals received during the predefined period.

8. The communication system according to claim 7, wherein each of the plurality of connecting communication devices includes, in the connection permit signal, information indicating that the number of requesting candidates is plural when congestion of the connection request signals is detected during the predefined period, and the connection requesting communication device sets the transmission probability to a preset probability when the information indicating that the number of requesting candidates is plural is included in the connection permit signal.

9. The communication system according to claim 7, wherein each of the plurality of connecting communication devices transmits a period setup signal for setting up the predefined period along with control information necessary for initiating communication with the connecting communication device, and the connection requesting communication device transmits the connection request signal within the predefined period specified by the period setup signal.

10. The communication system according to claim 7, wherein the communication system includes a plurality of the connection requesting communication devices, and wherein each of the plurality of connecting communication devices includes, in the connection permit signal, identification information identifying the connection requesting communication device that transmitted the connection request signal among the plurality of the connection requesting communication devices, and when the identification information of the connection requesting communication device is not included in the connection permit signal, the connection requesting communication device does not transmit out the signal at the timing that the signal can be transmitted to the connecting communication device among the plurality of connecting communication devices from which the connection permit signal was received, and when the identification information of the first communication device is included in the connection permit signal, the connection requesting communication device makes a decision as to whether or not to transmit the signal out in accordance with the transmission probability at the timing that the signal can be transmitted to the connecting communication device from which the connection permit signal was received.

11. The communication system according to claim 6, wherein the communication system includes a plurality of the connection requesting communication devices, and a different communication channel is allocated to each connection requesting communication device in the predefined period.

12. A communication device comprising:

a storage unit which stores the number of requesting candidates contained in a connection permit signal received from another communication device and indicting the number of signals likely to contend at that other communication device;

a control unit which obtains a transmission probability defining the probability of signal transmission such that the transmission probability decreases as the number of requesting candidates increases, and which makes a decision as to transmit a signal to be relayed by the other communication device out in accordance with the transmission probability and generates the signal when a decision is made to transmit the signal out; and a wireless signal processing unit which transmits a wireless signal containing the generated signal, wherein when the communication device has received a plurality of the connection permit signals from the plurality of the other communication devices, the control unit determines the transmission probability based on the smallest of the numbers of requesting candidates contained in the respective connection permit signals, and the control unit makes a decision as to whether or not to transmit the signal out at the timing that the signal can be transmitted to the other communication device corresponding to the smallest number of requesting candidates.

* * * * *